US011742629B2

(12) United States Patent
Wetzel et al.

(10) Patent No.: US 11,742,629 B2
(45) Date of Patent: Aug. 29, 2023

(54) METHOD AND SYSTEM FOR NONLINEAR OPTICAL PROCESS OPTIMIZATION VIA TEMPORAL PULSE SPLITTING

(71) Applicants: THE UNIVERSITY OF SUSSEX, Brighton (GB); THE UNIVERSITY COURT OF THE UNIVERSITY OF GLASGOW, Glasgow (GB); INSTITUT NATIONAL DE LA RECHERCHE SCIENTIFIQUE, Quebec (CA)

(72) Inventors: Benjamin Wetzel, Limoges (FR); Michael Kues, Hanover (DE); Christian Reimer, Lubeck (DE); Robin Helsten, Montreal (CA); Piotr Roztocki, Montreal (CA); Yoann Jestin, Montreal (CA); Roberto Morandotti, Montreal (CA)

(73) Assignees: INSTITUT NATIONAL DE LA RECHERCHE SCIENTIFIQUE, Quebec (CA); THE UNIVERSITY OF SUSSEX, Brighton (GB); THE UNIVERSITY COURT OF THE UNIVERSITY OF GLASGOW, Glasgow (GB)

(*) Notice: Subject to any disclaimer, the term of this patent is extended or adjusted under 35 U.S.C. 154(b) by 202 days.

(21) Appl. No.: 16/966,337

(22) PCT Filed: Feb. 5, 2019

(86) PCT No.: PCT/CA2019/050144
§ 371 (c)(1),
(2) Date: Jul. 30, 2020

(87) PCT Pub. No.: WO2019/148298
PCT Pub. Date: Aug. 8, 2019

(65) Prior Publication Data
US 2020/0373726 A1 Nov. 26, 2020

(30) Foreign Application Priority Data

Feb. 5, 2018 (GB) .................................. 1801825

(51) Int. Cl.
*H01S 3/10* (2006.01)
*G02F 1/35* (2006.01)
(Continued)

(52) U.S. Cl.
CPC ........... *H01S 3/10046* (2013.01); *G02F 1/35* (2013.01); *H01S 3/0057* (2013.01);
(Continued)

(58) Field of Classification Search
CPC .. H01S 3/0057; H01S 3/0092; H01S 3/06791; H01S 3/10046; H01S 3/1305; H01S 3/136
See application file for complete search history.

(56) References Cited

U.S. PATENT DOCUMENTS 6,233,085 B1   5/2001   Johnson
6,241,397 B1   6/2001   Bao et al.
(Continued)

FOREIGN PATENT DOCUMENTS

WO   WO2018108900   *  6/2018

OTHER PUBLICATIONS

Kerrinckx, E., et al., "Photonic crystal fiber design by means of a genetic algorithm". Optics Express, 2004. 12(9): p. 1990-1995.
(Continued)

*Primary Examiner* — Michael Carter

(57) ABSTRACT

A method and a system for controlling an output of an optical system, the method comprising generating a plurality of optical signal components having different optical properties and passing the generated optical signal components as input to an optical system comprising an optical device
(Continued)

and/or an optical medium; an output of the optical system being based on interactions of the signal components within the optical device and/or the optical medium; and relative proportions of the optical signal components that are generated and individual optical properties thereof being selected to control the output of the optical system.

19 Claims, 13 Drawing Sheets

(51) Int. Cl.
  *H01S 3/00* (2006.01)
  *H01S 3/067* (2006.01)
  *H01S 3/13* (2006.01)
  *H01S 3/136* (2006.01)
(52) U.S. Cl.
  CPC ........ *H01S 3/0092* (2013.01); *H01S 3/06791* (2013.01); *H01S 3/1305* (2013.01); *H01S 3/136* (2013.01); *G02F 1/3503* (2021.01); *G02F 1/3528* (2021.01)

(56) References Cited

U.S. PATENT DOCUMENTS

| | | | |
|---|---|---|---|
| 7,171,089 B2 | 1/2007 | Feder et al. | |
| 7,177,027 B2 | 2/2007 | Hirasawa et al. | |
| 7,973,936 B2 | 7/2011 | Dantus | |
| 8,094,292 B2 | 1/2012 | Park et al. | |
| 8,208,505 B2 | 6/2012 | Dantus et al. | |
| 8,265,110 B2 | 9/2012 | Dantus et al. | |
| 8,630,322 B2 | 1/2014 | Dantus et al. | |
| 8,633,437 B2 | 1/2014 | Dantus et al. | |
| 8,675,699 B2 | 3/2014 | Dantus et al. | |
| 8,718,411 B2 | 5/2014 | Austin et al. | |
| 8,831,056 B2 | 9/2014 | Savchenkov et al. | |
| 2003/0215173 A1 | 11/2003 | Hakimi et al. | |
| 2003/0228095 A1 | 12/2003 | Hakimi et al. | |
| 2009/0010288 A1* | 1/2009 | Keaton | H01S 3/2325 372/25 |
| 2009/0028195 A1* | 1/2009 | Grapov | G02F 1/3544 372/22 |
| 2009/0080467 A1* | 3/2009 | Starodoumov | H01S 3/06754 372/6 |

OTHER PUBLICATIONS

Lozovoy, V.V., et al., "Systematic control of nonlinear optical processes using optimally shaped femtosecond pulses". ChemPhysChem, 2005. 6(10): p. 1970-2000.
Pearson, B., et al., "Coherent control using adaptive learning algorithms". Physical Review A, 2001. 63(6): p. 063412.
Prudenzano, F., et al., "Optimization and characterization of rare-earth-doped photonic-crystal-fiber amplifier using genetic algorithm". Journal of Lightwave Technology, 2007. 25(8): p. 2135-2142.
Shane, J.C., et al., "Search space mapping: getting a picture of coherent laser control". The Journal of Physical Chemistry A, 2006. 110(40): p. 11388-11391.
Zeidler, D., et al., "Evolutionary algorithms and their application to optimal control studies". Physical Review A, 2001. 64(2): p. 023420.
LeCun, Y. et al., "Deep Learning". Nature, 2015. 521(7553): p. 436-444.
Pelikan, M., et al., "BOA: The Bayesian optimization algorithm" in Proceedings of the 1st Annual Conference on Genetic and Evolutionary Computation—vol. 1. 1999. Morgan Kaufmann Publishers Inc.
Xu, S., et al., "Controlling nonlinear processes in microstructured fibers using shaped pulses". Optics Express, 2004 12(20): p. 4731-4741.
Boscolo, S., et al., "Pulse shaping in mode-locked fiber lasers by in-cavity spectral filter". Optics letters, 2014. 39(3): p. 438-441.
Boscolo, S., et al., "Design and Applications of In-Cavity Pulse Shaping by Spectral Sculpturing in Mode-Locked Fibre Lasers". Applied Sciences, 2015. 5(4): p. 1379-1398.
Woodward, R., et al., "Towards 'smart lasers': self-optimisation of an ultrafast pulse source using a genetic algorithm". arXiv preprint arXiv:1607.05688, 2016.
Woodward, R.I., et al., "Self-optimizing mode-locked laser using a genetic algorithm", in CLEO: Science and Innovations. 2016. Optical Society of America.
Bolger, J., et al., "Tunable enhancement of a soliton spectrum using an acoustic long-period grating". Optics Express, 2007. 15(20): p. 13457-13462.
Castelló-Lurbe, D., et al., "Spectral broadening enhancement in silicon waveguides through pulse shaping". Optics Letters, 2012. 37(13): p. 2757-2759.
Lorenc, D., et al., "Adaptive femtosecond pulse shaping to control supercontinuum generation in a microstructure fiber". Optics communications, 2007. 276(2): p. 288-292.
Nguyen, D.M., et al., "Incoherent resonant seeding of modulation instability in optical fiber". Optics Letters, 2013. 38(24): p. 5338-5341.
Omenetto, F.G., et al., "Adaptive control of femtosecond pulse propagation in optical fibers". Optics Letters, 2001. 26(12): p. 938-940.
Tada, J., et al., "Adaptively controlled supercontinuum pulse from a microstructure fiber for two-photon excited fluorescence microscopy". Applied Optics, 2007. 46(15): p. 3023-3030.
You, C., et al., "Extending the Broadening Limits in Silicon Waveguides by Pre-Shaping a Chirped Pump Pulse". IEEE Photonics Technology Letters, 2015. 27(2): p. 125-128.
Bendahmane, A., et al., "Coherent and incoherent seeding of dissipative modulation instability in a nonlinear fiber ring cavity". Optics Letters, 2017. 42(2): p. 251-254.
Dudley, J.M., et al., "Harnessing and control of optical rogue waves in supercontinuum generation". Optics Express, 2008. 16(6): p. 3644-3651.
Baumert, T., et al., "Femtosecond pulse shaping by an evolutionary algorithm with feedback". Applied Physics B: Lasers and Optics, 1997. 65(6): p. 779-782.
Form, N.T., et al., "Parameterization of an acousto-optic programmable dispersive filter for closed-loop learning experiments". Journal of Modern Optics, 2008. 55(1): p. 197-209.
Plewicki, M., et al., "Independent control over the amplitude, phase, and polarization of femtosecond pulses". Applied Physics B: Lasers and Optics, 2007. 86(2): p. 259-263.
Thomas, S., et al., "Programmable fiber-based picosecond optical pulse shaper using time-domain binary phase-only linear filtering". Optics Letters, 2009. 34(4): p. 545-547.
Weiner, A.M., "Ultrafast optical pulse shaping: A tutorial review". Optics Communications, 2011. 284(15): p. 3669-3692.
Lindinger, A., et al., "Spectral modification of supercontinuum light by means of fs-light pulses optimized in a closed learning loop". Optica Applicata, 2004. 34(3): p. 341-348.
Yang, X., et al., "Nonlinear generation of ultra-flat broadened spectrum based on adaptive pulse shaping". Journal of Lightwave Technology, 2012. 30(12): p. 1971-1977.
Andresen, E.R., et al., "Soliton dynamics in photonic-crystal fibers for coherent Raman microspectroscopy and microscopy". Optical Fiber Technology, 2012. 18(5): p. 379-387.
Friberg, S.R., "Soliton fusion and steering by the simultaneous launch of two different-color solitons". Optics Letters, 1991. 16(19): p. 1484-1486.
Liu, L., et al., "Multiple soliton self-frequency shift cancellations in a temporally tailored photonic crystal fiber". Applied Physics Letters, 2014. 105(18): p. 181113.
Voronin, A., et al., "Spectral interference of frequency-shifted solitons in a photonic-crystal fiber". Optics Letters, 2009. 34(5): p. 569-571.

(56) References Cited

OTHER PUBLICATIONS

Hou, J., et al., "Experimental demonstration of reconfigurable pulses generation based on integrated optical differentiators" in Asia Communications and Photonics Conference 2016. 2016. Wuhan: Optical Society of America.
Hou, J., et al., "Reconfigurable symmetric pulses generation using on-chip cascaded optical differentiators". Optics Express, 2016. 24(18): p. 20529-20541.
Caraquitena, J., et al., "Simultaneous repetition-rate multiplication and envelope control based on periodic phase-only and phase-mostly line-by-line pulse shaping". JOSA B, 2007. 24(12): p. 3034-3039.
Latkin, A.I., et al., "Doubling of optical signals using triangular pulses". JOSA B, 2009. 26(8): p. 1492-1496.
Maram, R., et al., "Sub-harmonic periodic pulse train recovery from aperiodic optical pulse sequences through dispersion-induced temporal self-imaging". Optics Express, 2015. 23(3): p. 3602-3613.
Weise, F., et al., "Systematic variation of parametrically shaped sub-pulse sequences after transmission through a photonic crystal fiber". Optics Communications, 2011. 284(15): p. 3759-3771.
Zhang, F., et al., "Triangular pulse generation using a dual-parallel Mach-Zehnder modulator driven by a single-frequency radio frequency signal". Optics Letters, 2013. 38(21): p. 4491-4493.
Lee, J.H., et al., "2~ 5 times tunable repetition-rate multiplication of a 10 GHz pulse source using a linearly tunable, chirped fiber Bragg grating". Optics Express, 2004. 12(17): p. 3900-3905.
Delfyett, P.J., et al., "Joint time-frequency measurements of modelocked semiconductor diode lasers and dynamics using frequency-resolved optical gating". IEEE Journal of Quantum Electronics, 1999. 35(4): p. 487-500.
Trebino, R., "Frequency-resolved optical gating: the measurement of ultrashort laser pulses". 2012: Springer Science & Business Media. Contents.
Melanie Mitchell, "An Introduction to Genetic Algorithms", A Bradford Book The MIT Press, Cambridge, Massachusetts, London, England, Fifth printing, 1999. Table of Contents.
Dipankar Dasgupta, et al., "Evolutionary Algorithms in Engineering Applications", Springer-Verlag Berlin Heidelberg, 1997. Table of Contents.
Carlos A. Coello Coello, et al., "Evolutionary Algorithms for Solving Multi-Objective Problems", Second Edition, Springer Science+Business Media, LLC, 2007. Contents.
Stefan Wabnitz, et al., "All-Optical Signal Processing, Data Communication and Storage Applications", Springer International Publishing Switzerland, 2015. Contents.
Yuri S. Kivshar, et al., "Optical Solitons, From Fibers to Photonic Crystals", Elsevier Science (USA), 2003. Contents.
Akira Hasegawa, "Optical Solitons in Fibers", Second Enlarged Edition, Springer-Verlag Beriin Heidelberg 1989 and 1990. Contents.
J.M. Dudley, et al., "Supercontinuum Generation in Optical Fibers", Cambridge University Press 2010. Contents.
Goldberg, D.E., et al., « Genetic algorithms and machine learning. Machine Learning, 1988. 3(2): p. 95-99.
Boyd, R.W., "Nonlinear Optics". 2003: Academic Press.
Dudley, J.M., et al., "Supercontinuum generation in photonic crystal fiber". Reviews of Modern Physics, 2006. 78(4): p. 1135.
Udem, T., et al., "Optical frequency metrology". Nature, 2002. 416(6877): p. 233-237.
El-Diasty, F., "Coherent anti-Stokes Raman scattering: spectroscopy and microscopy". Vibrational Spectroscopy, 2011. 55(1): p. 1-37.
Horton, N.G., et al., "In vivo three-photon microscopy of subcortical structures within an intact mouse brain". Nat Photon, 2013. 7(3): p. 205-209.
Ideguchi, T., et al., "Coherent Raman spectro-imaging with laser frequency combs". Nature, 2013. 502(7471): p. 355-358.
Tu, H. et al., "Coherent fiber supercontinuum for biophotonics". Laser & photonics reviews, 2013. 7(5): p. 628-645.
Fischer, M.C., et al., "Invited Review Article: Pump-probe microscopy". Review of Scientific Instruments, 2016. 87(3): p. 031101.
Das, R.S. et al., "Raman spectroscopy: recent advancements, techniques and applications". Vibrational Spectroscopy, 2011. 57(2): p. 163-176.
Duchesne, D., et al., "Supercontinuum generation in a high index doped silica glass spiral waveguide". Optics Express, 2010. 18(2): p. 923-930.
Dudley, J.M. et al., "Coherence properties of supercontinuum spectra generated in photonic crystal and tapered optical fibers". Optics Letters, 2002. 27(13): p. 1180-1182.
Tianprateep, M., et al., "Influence of polarization and pulse shape of femtosecond initial laser pulses on spectral broadening in microstructure fibers". Optical review, 2005. 12(3): p. 179-189.
Gordon, J.P., "Theory of the soliton self-frequency shift". Optics Letters, 1986. 11(10): p. 662-664.
Mitschke, F.M., et al., "Discovery of the soliton self-frequency shift". Optics Letters, 1986. 11(10): p. 659-661.
Karasawa, N., et al., "Optical solitons from a photonic crystal fiber and their applications". 2012: INTECH Open Access Publisher.
Andresen, E.R., et al., "Nonlinear pulse shaping by coherent addition of multiple redshifted solitons". JOSA B, 2011. 28(7): p. 1716-1723.
Tada, K., et al., "Broadband coherent anti-Stokes Raman scattering spectroscopy using soliton pulse trains from a photonic crystal fiber". Optics Communications, 2009. 282(19): p. 3948-3952.
Hornung, T., et al., "Optimal control of one-and two-photon transitions with shaped femtosecond pulses and feedback". Applied Physics B, 2000. 71(3): p. 277-284.
Liu, Y., et al., "Broadband nonlinear vibrational spectroscopy by shaping a coherent fiber supercontinuum". Optics Express, 2013. 21(7): p. 8269-8275.
Oron, D., et al., "Femtosecond phase-and-polarization control for background-free coherent anti-Stokes Raman spectroscopy". Physical Review Letters, 2003. 90(21): p. 213902.
von Vacano, B., et al., "Time-resolved two color single-beam CARS employing supercontinuum and femtosecond pulse shaping". Optics Communications, 2006. 264(2): p. 488-493.
Wang, K., et al., "Three-color femtosecond source for simultaneous excitation of three fluorescent proteins in two-photon fluorescence microscopy". Biomedical Optics Express, 2012. 3(9): p. 1972-1977.
Zeytunyan, A., et al., "Supercontinuum-based three-color three-pulse time-resolved coherent anti-Stokes Raman scattering". Optics Express, 2015. 23(18): p. 24019-24028.
Zumbusch, A., et al., "Three-Dimensional Vibrational Imaging by Coherent Anti-Stokes Raman Scattering". Physical Review Letters, 1999. 82(20): p. 4142-4145.
Shang, L., et al., "A flat and broadband optical frequency comb with tunable bandwidth and frequency spacing". Optics Communications, 2014. 331: p. 262-266.
Yang, X., et al., "An ultra-flat frequency comb generated using nonlinear broadening and adaptive pulse shaping" presented at Optical Fiber Communication Conference. 2012. Optical Society of America.
Ament, C., et al., "Supercontinuum generation with femtosecond self-healing Airy pulses". Physical Review Letters, 2011. 107(24): p. 243901.
Arteaga-Sierra, F.R., et al., "Supercontinuum optimization for dual-soliton based light sources using genetic algorithms in a grid platform". Optics Express, 2014. 22(19): p. 23686-23693.
Dharmadhikari, J., et al., "Influencing supercontinuum generation by phase distorting an ultrashort laser pulse". Optics Letters, 2015. 40(2): p. 241-244.
Frosz, M.H., et al., "Increasing the blue-shift of a supercontinuum by modifying the fiber glass composition". Optics Express, 2008. 16(25): p. 21076-21086.
Hu, Y., et al., "Improved intrapulse Raman scattering control via asymmetric Airy pulses". Physical Review Letters, 2015. 114(7): p. 073901.
Lu, H., et al., "Optimization of supercontinuum generation in air-silica nanowires". JOSA B, 2010. 27(5): p. 904-908.

(56) References Cited

OTHER PUBLICATIONS

Yang, X., et al., "Broadband, flat frequency comb generated using pulse shaping-assisted nonlinear spectral broadening". IEEE Photonics Technology Letters, 2013. 25(6): p. 543-545.
Kues, M., et al., "Passively mode-locked laser with an ultra-narrow spectral width". Nat Photon, 2017. Advance online publication.
Boscolo, S., et al., "Nonlinear pulse shaping and polarization dynamics in mode-locked fiber lasers". International Journal of Modern Physics B, 2014. 28(12): p. 1442011.
Copie, F., et al., "Dynamics of Turing and Faraday instabilities in a longitudinally modulated fiber-ring cavity". Optics Letters, 2017. 42(3): p. 435-438.
Peng, J., et al., "Filter-Based Dispersion-Managed Versatile Ultrafast Fibre Laser". Sci Rep 6, 25995 (2016).
Xie, R., et al., "Multi-modal label-free imaging based on a femtosecond fiber laser". Biomedical Optics Express, 2014. 5(7): p. 2390-2396.
Yang, X., et al., "Passively Mode-Locked Fiber Laser Incorporating Adaptive Filtering and Dispersion Management" in CLEO: 2013, OSA Technical Digest (online) (Optical Society of America, 2013), paper CM1I.1.
Andral, U., et al., "Fiber laser mode locked through an evolutionary algorithm". Optica, 2015. 2(4): p. 275-278.
Assion, A., et al., "Control of chemical reactions by feedback-optimized phase-shaped femtosecond laser pulses". Science, 1998. 282(5390): p. 919-922.
Bardeen, C.J., et al., "Feedback quantum control of molecular electronic population transfer". Chemical Physics Letters, 1997. 280(1): p. 151-158.
Bartels, R., et al., "Shaped-pulse optimization of coherent emission of high-harmonic soft X-rays". Nature, 2000. 406(6792): p. 164-166.
Bonacina, L., et al., "Multiobjective genetic approach for optimal control of photoinduced processes". Physical Review A, 2007. 76(2): p. 023408.
Dantus, M., et al., "Experimental coherent laser control of physicochemical processes". Chemical Reviews, 2004. 104(4): p. 1813-1860.
Sholami, S., et al., "Optimization strategy to find shapes of soliton molecules". Applied Physics B, 2014. 116(1): p. 43-52.
Hornung, T., et al., "Optimal control of molecular states in a learning loop with a parameterization in frequency and time domain". Chemical Physics Letters, 2000. 326(5): p. 445-453.
Kashiwagi, K., et al., "Background suppression in synthesized pulse waveform by feedback control optimization for flatly broadened supercontinuum generation". Optics Express, 2013. 21(3): p. 3001-3009.
Zeidler, D. et al., "Adaptive compression of tunable pulses from a non-collinear-type OPA to below 16 by feedback-controlled pulse shaping", Appl. Phys. B, 70 [Suppl.], 2000, p. S125-S131.

* cited by examiner

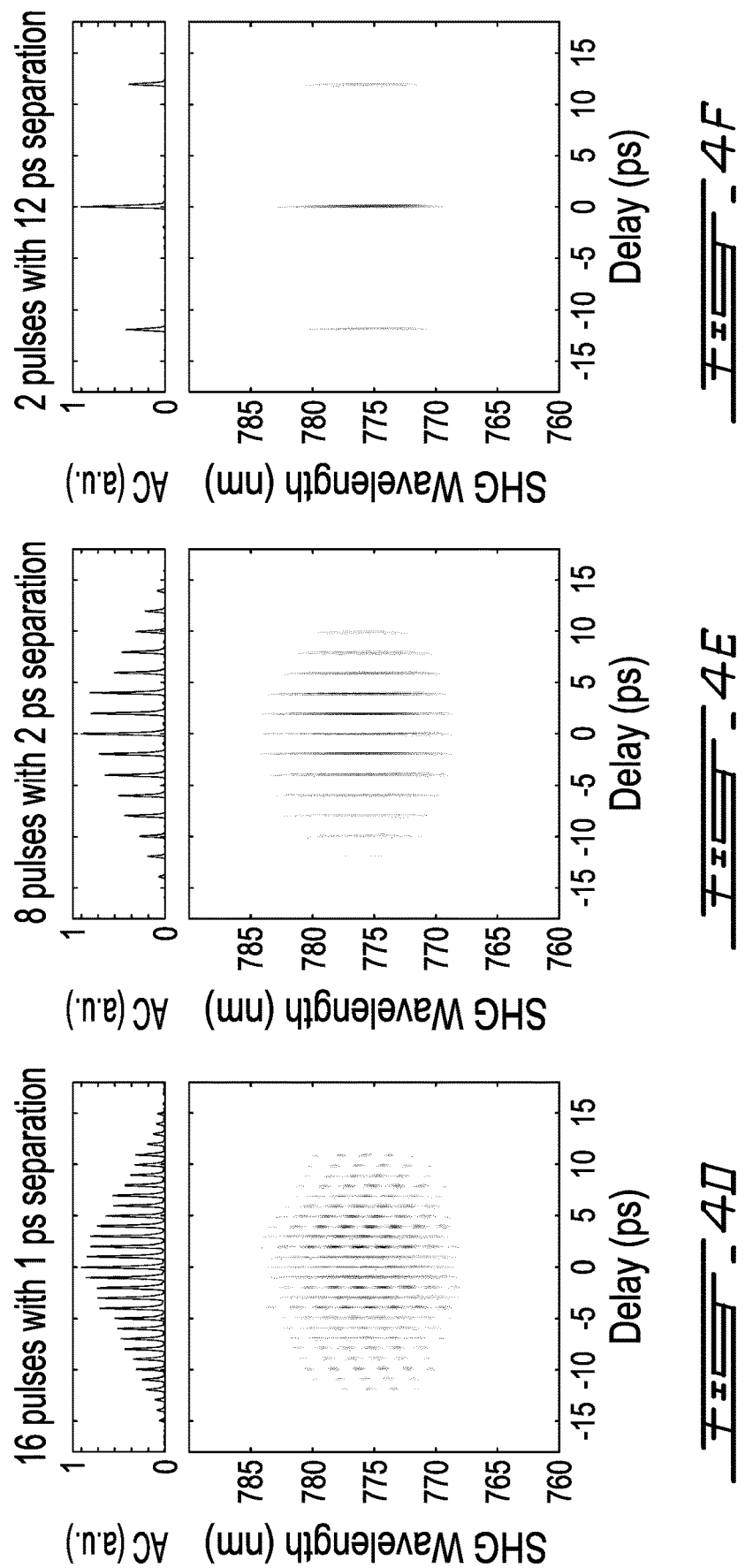

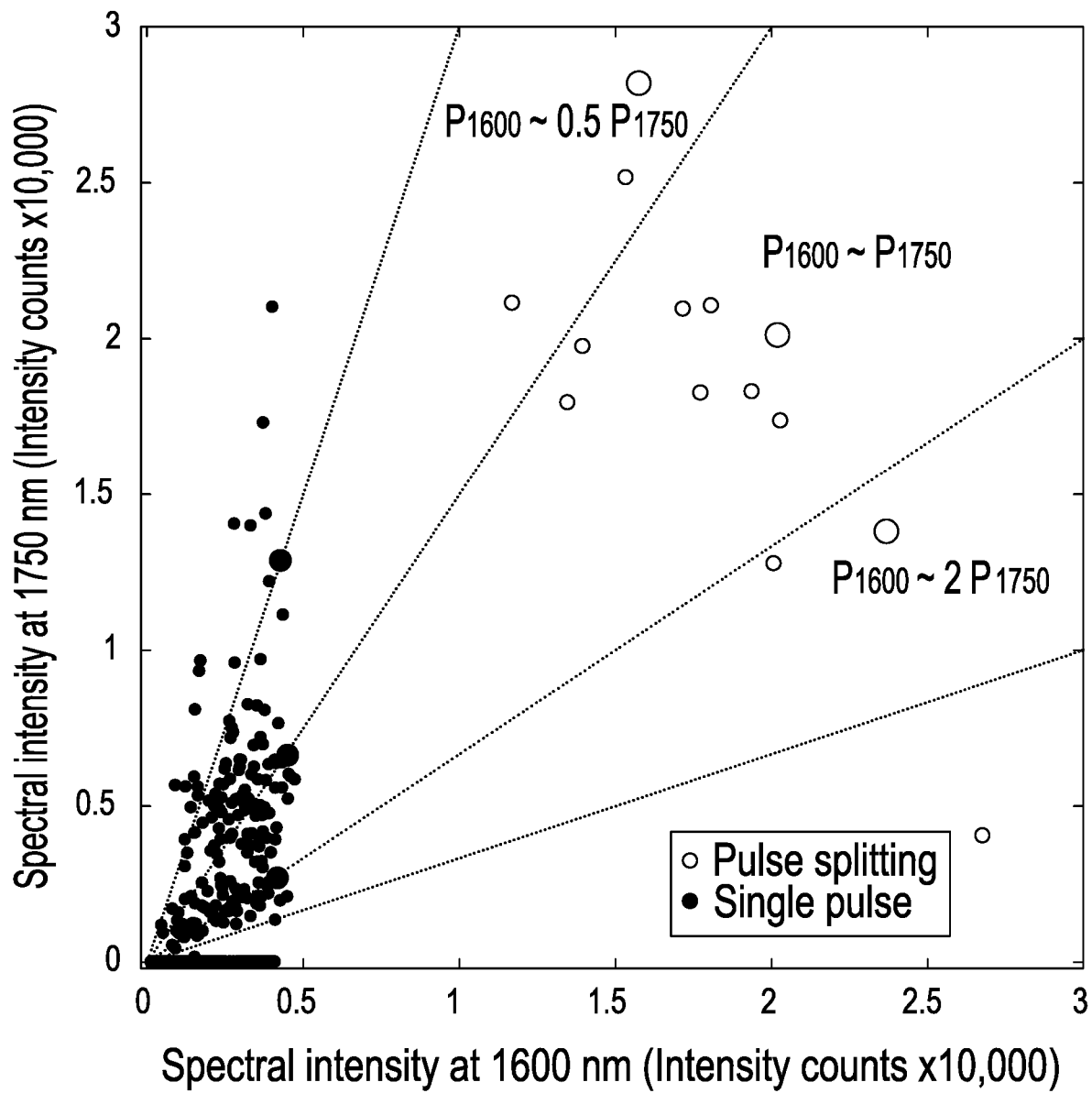

METHOD AND SYSTEM FOR NONLINEAR OPTICAL PROCESS OPTIMIZATION VIA TEMPORAL PULSE SPLITTING

CROSS-REFERENCE TO RELATED APPLICATIONS

This application is a National Entry Application of PCT application no PCT/CA2019/148298 filed on Feb. 5, 2019 and published in English under publication number WO 2019/148298 under PCT Article 21(2), which itself claims benefit of British provisional application Serial No. GB1801825.9, filed on Feb. 8, 2018. All documents above are incorporated herein in their entirety by reference.

FIELD OF THE INVENTION

The present invention relates to optical systems. More specifically, the present invention is concerned with a method and a system for nonlinear optical process optimization.

BACKGROUND OF THE INVENTION

Modern optical systems increasingly rely on complex physical processes. For example, nonlinear optical processes such as frequency conversion, polarization rotation, optical mode competition, and even scattering processes, form the basis of optical systems for use in various applications including developing advanced light source systems such as mode-locked ultrafast lasers for example; metrology such as. frequency-comb-based measurements for example, or real-time measurement methods; and optical imaging/characterization methods such as fluorescence spectroscopy, pump-probe measurements for example.

In order to achieve the optical output properties desired for a specific application these complex processes need to somehow be controlled and the optical system optimized accordingly. However, the interactions that are being exploited within these systems typically involve multiple dynamics that are difficult to describe using mathematical models, and/or rely on a large number of unknown parameters, and the means for controlling the (nonlinear) dynamics in such complex optical systems are typically limited in terms of the degree of control provided, as well as in terms of specificity, power efficiency, cost, handling and compactness, etc. Finding the optimum design parameters for a particular optical system, or efficiently tuning an optical system for a specific application, is therefore a significant problem.

An illustrative example where this problem is relevant is in the generation of a so-called "supercontinuum", referring to broadband light that is generated by an optical pulse propagating in a nonlinear medium wherein the spectral and temporal characteristic of the pulse evolve under the combined action of dispersion, nonlinearities, and scattering effects in the medium. Supercontinuum generation is intrinsically based on a variety of nonlinear optical processes exhibiting complex dynamics. Although many of the physical interactions underlying supercontinuum generation are generally understood, and at least in some specific operational regimes may even be addressed analytically or numerically, the optimization of the spectral and temporal outputs of the supercontinuum still constitutes a significant challenge.

Apart from the specific example of supercontinuum generation mentioned above, similar problems can be found in many other branches of optics, as well as related applications using optical systems, wherein the dynamics of the system intrinsically rely on complex for example nonlinear or chaotic processes, or are dependent on parameters that cannot easily be controlled or are too numerous to be addressed analytically or numerically. For example, similar challenges may be found in many photonic systems including optical cavities for, for example frequency comb generation based on a large number of optical mode interactions, or mode-locked lasers, wherein the cavity parameters, including for example polarization, power, losses, cavity length, etc., may require fine adjustment to achieve a targeted light emission regime.

Accordingly, there remains a need for a method and a system for nonlinear optical process optimization.

SUMMARY OF THE INVENTION

More specifically, in accordance with the present invention, there is provided a method for controlling an output of an optical system, the method comprising: generating a plurality of optical signal components having different optical properties; and passing the generated optical signal components as input to an optical system comprising at least one of: i) an optical device and ii) an optical medium; wherein an output of the optical system is based on interactions of the signal components within the at least one of: i) an optical device and ii) an optical medium; and wherein relative proportions of the optical signal components that are generated and individual optical properties thereof are selected to control the output of the optical system.

There is further provided an optical apparatus, comprising a signal preparation device operable to generate as output a plurality of optical signal components having different optical properties; and an optical system comprising at least one of: i) an optical device and ii) an optical medium, receiving the optical signal components generated by the signal preparation device as input in order to generate an output of the optical system; wherein the output of the optical system is based on interactions of the signal components within the at least one of: i) an optical device and ii) an optical medium, and wherein the signal preparation device is configured to at least one of: i) select and ii) control the relative proportions of the optical signal components that are generated and the individual optical properties thereof, and to thereby control the output of the optical system.

There is further provided a feedback system, comprising an optical source generating an input optical signal and an optical cavity including a signal preparation device, the signal preparation device acting on the input optical signal provided by the optical source to generate a plurality of optical signal components having different properties, wherein relative proportions of the optical signal components that are generated and the individual optical properties thereof are used to provide feedback to the system.

There is further provided a laser system comprising a laser cavity including a gain medium and a signal preparation device, the signal preparation device generating a plurality of optical signal components having different properties, wherein relative proportions of the optical signal components that are generated and the individual optical properties thereof are at least one of: i) selected and ii) controlled to control the output of the laser system.

There is further provided a signal preparation device configured to generate a plurality of optical signal components having different optical properties, wherein the signal preparation device is further configured to adjust the proportions of the optical signal components that are generated and the individual optical properties thereof.

Other objects, advantages and features of the present invention may become more apparent upon reading of the following non-restrictive description of specific embodiments thereof, given by way of example only with reference to the accompanying drawings.

BRIEF DESCRIPTION OF THE DRAWINGS

In the appended drawings:

FIG. 4 show characterization of optical pulse bunches generated from the integrated delay line sample; for each configuration, FIG. 4D, FIG. 4E, FIG. 4F show the corresponding Frequency Resolved-Optical Gating (FROG) trace;

FIG. 9 is a Pareto front showing the optimal set of spectral intensities at 1600 nm and 1750 nm retrieved by using a 16 pulse splitting optimization (the upper set of black dots) and compared with the optimal cases measured using a single input pulse with variable power (the lower set of grey dots)

DESCRIPTION OF ILLUSTRATIVE EMBODIMENTS

The present invention is illustrated in further details by the following non-limiting examples.

In general, the present method and system relate to methods and apparatuses for controlling or optimizing the outputs of complex, for example nonlinear, optical systems through the generation of multiple optical signal components, or pulse "replicas", having adjustable properties which can thus be tuned to allow for a better optimization of the output of complex optical systems for the end-user. For instance, the method and system presented herein may provide a versatile way to control the (input) optical parameter space, for example the optical properties of individual pulse replicas, such as power, phase, pulse shape, spectral shape/chirp, polarization, etc., and also the number of and relative delays between the pulse replicas. In particular, the method presented herein may allow for a versatile and independent tuning of multiple pulse properties that can in turn be used to efficiently control various complex, nonlinear processes in a wide variety of optical systems in order to tune the optical system towards a desired output.

Figure 1:
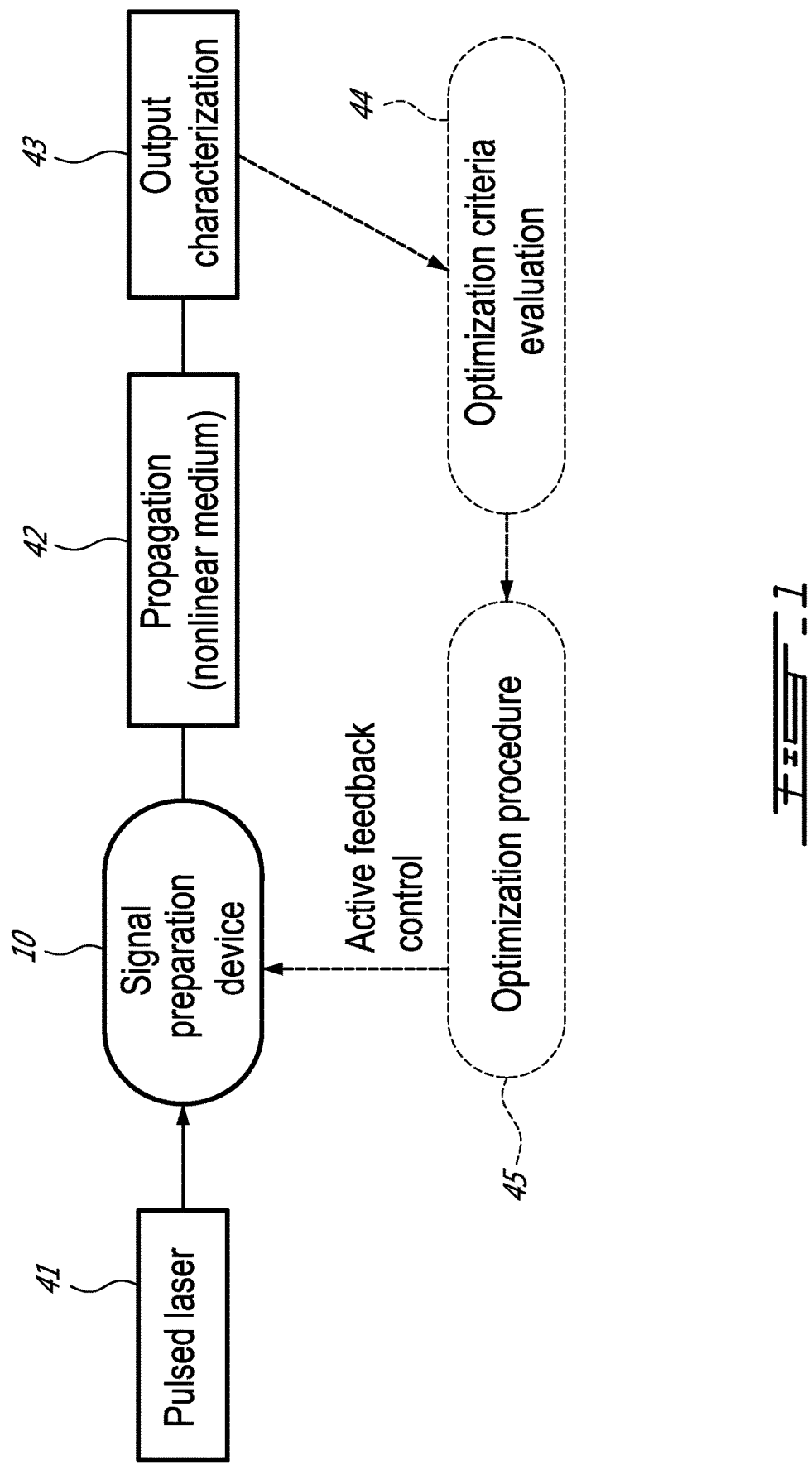
FIG. 1 is a schematic view of optimization of nonlinear frequency conversion processes, according to an embodiment of an aspect of the present disclosure.

For instance, FIG. 1 illustrates a first embodiment of an aspect of the present invention where multiple-pulse control within a controllable pulse replica system may be used to optimize nonlinear processes, such as frequency conversion, obtained by single-pass propagation in a nonlinear medium. As shown, optical pulses emitted from a given light source 41, typically a mode-locked femtosecond laser, are injected into a signal preparation device 10 that generates multiple pulse replicas that are sent into a nonlinear medium 42. Depending on the application, the nonlinear medium 42 may comprise, among other examples, an optical fiber, an integrated nonlinear waveguide, or an optical resonator. The output 43 from the nonlinear medium 42 is then characterized, spectrally and/or temporally, with respect to one or multiple optimization criteria 44, such as for instance enhancing the spectral intensity at a given wavelength in the output spectrum. By using an iterative optimization procedure 45, such as an evolutionary algorithm, the generated pulse replicas may be adjusted in order to enhance the quality of the output relative to one or multiple optimization criteria that can be selected by the user. This is, in this case, done by exciting one or multiple specific nonlinear dynamics by an iterative adjustment of the initial pulse replica parameters controlled via a feedback loop method, and a dedicated optimization algorithm to modify the input parameters, such as the number and type of pulses generated by the signal preparation device 10, without a priori knowledge of the system under study. That is, the feedback loop provides active and automatic feedback control of the signal preparation device 10 and hence of the output 43 of the system.

Figure 2:
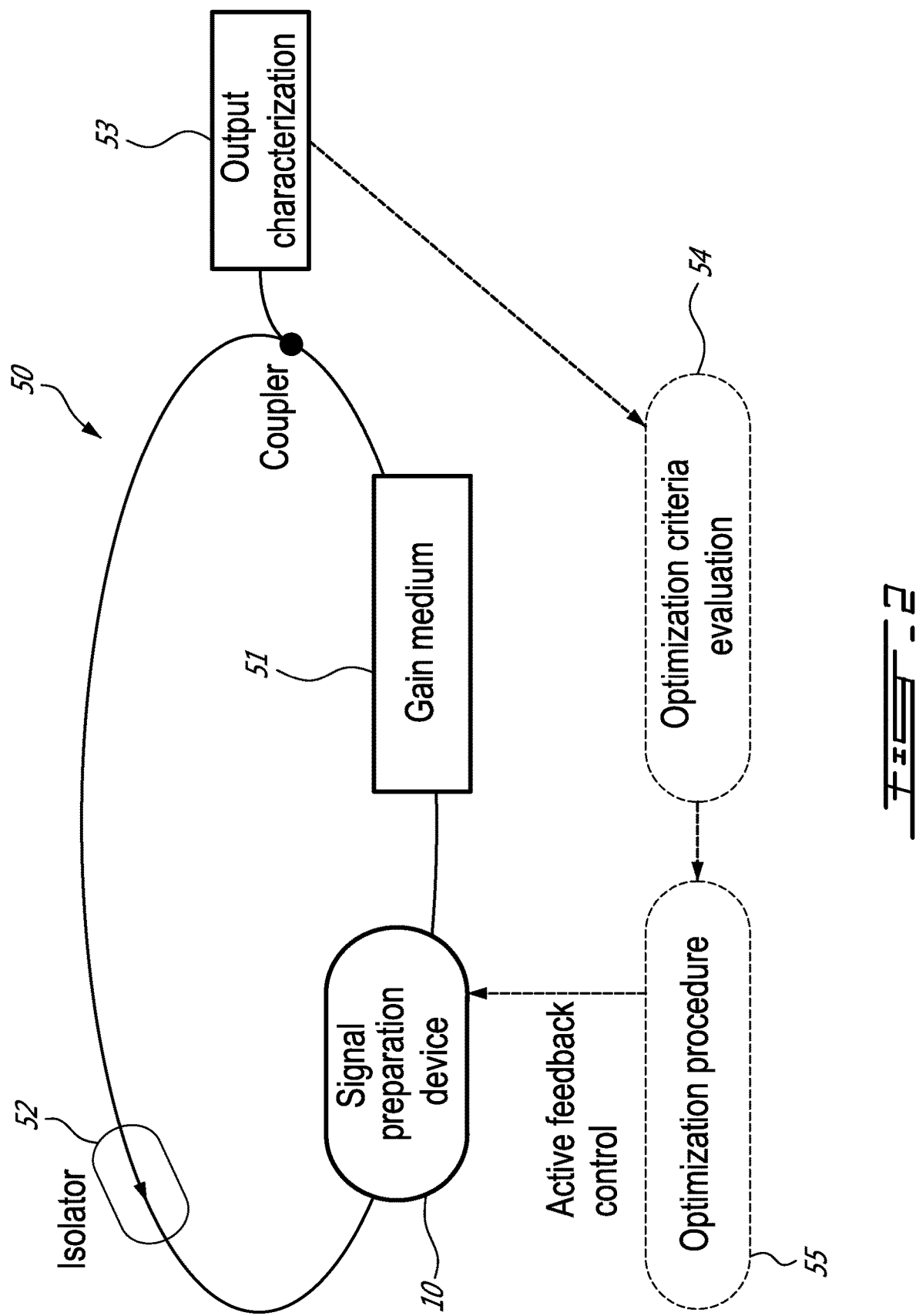
FIG. 2 is a schematic view of optimization of lasing cavities, according to an embodiment of an aspect of the present disclosure.

As another example, a similar optimization method is proposed for the control of nonlinear processes within an optical cavity, for example a laser cavity, as shown in FIG. 2. A signal preparation device 10 for controllably generating multiple pulse replicas is incorporated into the laser cavity 50 for example alongside the gain medium 51. Depending on the application, the gain medium can take different forms, while the cavity can also include additional elements such as filters, nonlinear elements for nonlinear polarization control s for example, saturable absorbers, external laser pump, etc. The coupled laser output 53 is then characterized with respect to one or multiple optimization criteria 54 and used in an iterative optimization procedure 55 to provide active feedback control to the signal preparation device 10 in a similar manner as in FIG. 1. In this case, as well as in variations of such laser architectures for example embedding additional filters, nonlinear elements such as polarization rotators, isolators 52, and of different cavity design (FIGS. 8 and 9), or with the addition of externally optical pumps etc., the use of the signal preparation device 10 in the laser cavity 50 to generate multiple optical signal components is foreseen as a viable means to control the lasing process and efficiently reach optimal lasing dynamic, for example passive mode-locking, Q-switching, etc. In particular, the use of such signal preparation device 10 may provide a way to finely adjust the overall cavity length, control the intracavity power, dispersion, and/or linear/nonlinear phase shifts based on the same control of the splitter switches described previously to control the light path in the multiple waveguides. In addition, the methods presented herein may enable the analogue of a 'static' modulation at frequencies that cannot be matched by electronics, such as in the THz regime or higher. Thus, this may provide a way to reach ultra-high repetition rate pulse trains similarly to active modulation methods, but here implemented directly by the generation and control of the multiple optical signal components. It may be appreciated that, more generally, the optical cavity need not comprise a gain medium as shown in FIG. 2, but may only comprise an external optical source to seed the cavity and to provide a (partial) optical feedback mechanism in the cavity.

Figure 3:
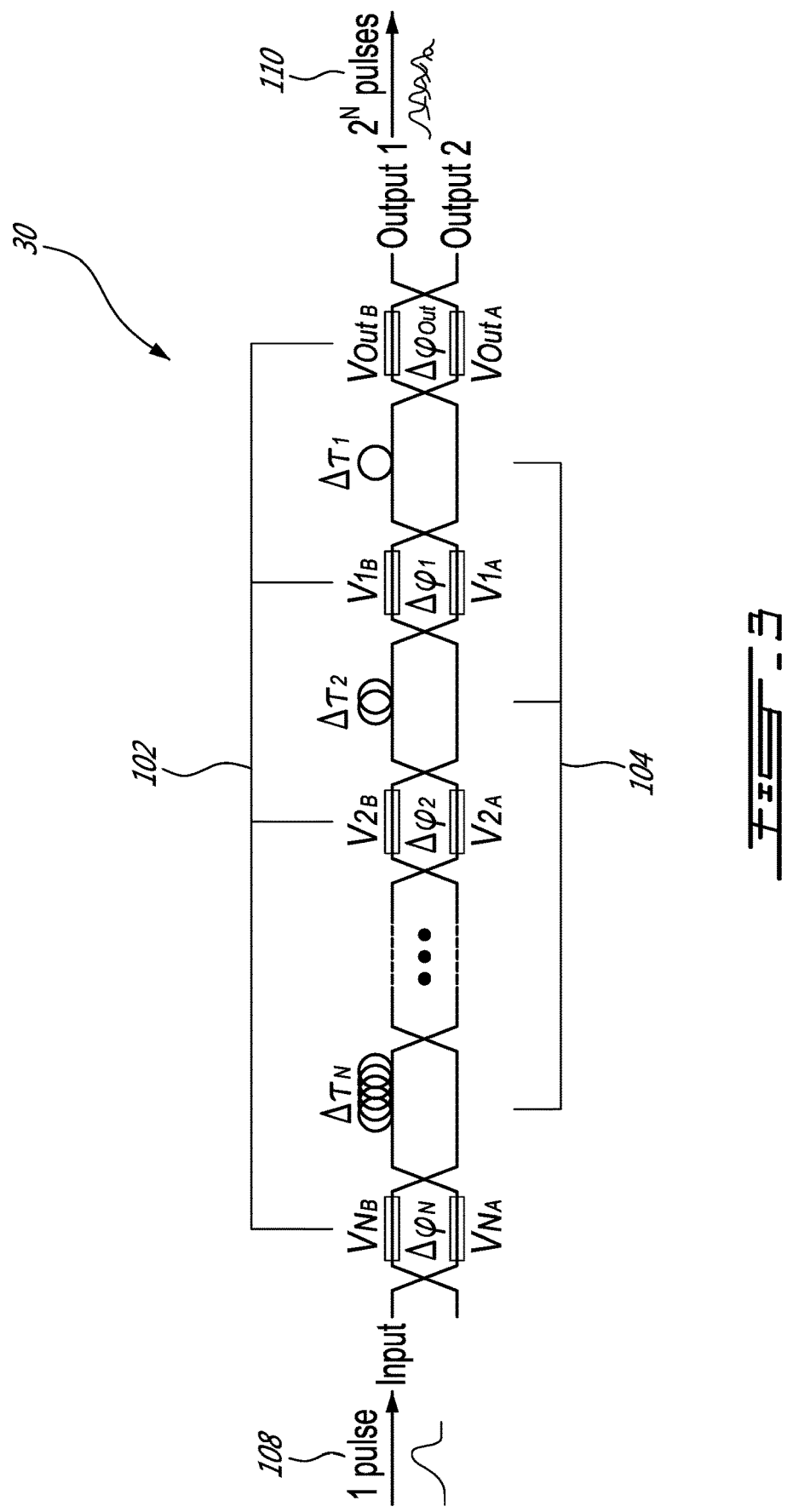
FIG. 3 is a schematic diagram of "temporal optical pulse splitter" used for optimization, according to an embodiment of an aspect of the present disclosure.

FIG. 3 illustrates an example of a signal preparation device 30 that may be used to generate such optical signal components in some embodiments. In this particular embodiment, the sample comprises several optical waveguides and beam-splitters (plain lines) constituting cascaded interferometers, playing the role of an optical switch, here controlled thermally, and unbalanced waveguide structures playing the role of delay lines. Depending on the voltage V applied on each electrode (square shades), a local and variable thermal modification can be imprinted on the surrounding optical waveguide. This induces a phase difference $\Delta\varphi$ between the two arms of the interferometer and allows for switching of the optical pulse path into either the shortest/longest path of the unbalanced waveguide structure, equivalent to a time delay $\Delta T$. Here, by using N cascaded Mach-Zender interferometers with a properly designed delay structure, where $\Delta T_N = 2\Delta T_{N-1}$, one can generate a bunch of $2^N$ optical pulses with adjustable powers and constant temporal separation $\Delta T_1$.

It may be appreciated that the signal preparation device may generally take various suitable forms, as desired. In an embodiment shown in FIG. 3 the device 30 comprises a cascade of signal splitting elements in the form of an alternating series of switching elements 102, here realized in the form of "balanced" interferometers, and signal modifying elements, taking here the form of delay lines 104, here realized in the form of "unbalanced" interferometers. The delay lines 104 each comprise, for example, two branches along which optical signals can travel such that an optical pulse 108 input to the device can travel through the device along multiple different pathways defined by the respective branches of the various delay lines 104. The delay lines 104 are generally configured so that optical signals travelling along the different branches thereof are modified in different ways. In particular, in the illustrated device, the delay lines 104 comprise "unbalanced" interferometers with two branches having different physical path lengths, so that optical signals travelling along the longer branch are delayed relative to those travelling along the shorter branch. For instance, as shown, for the $N^{th}$ delay line, a delay $\Delta TN$ is introduced. The delay lines 104 are arranged in a cascaded fashion to define a plurality of unique pathways through the device along with optical signals can travel. Thus, an input optical pulse 108 provided to the device can be split temporally into a series of pulse components 110 at the output of the device, with each of the pulse components having travelled along a different pathway through the device.

The switching elements 102 are used to control the proportion of optical signals that travel along the different pathways. In particular, in the illustrated device, each delay line 104 is associated with an upstream switching element 102 that is used to control the proportion of optical signals that travel along the different branches of that delay line 104. This method allows for a highly scalable and versatile generation of multiple optical pulse components with adjustable pulse properties. For instance, the relative delays and powers of the pulse components can be directly controlled by appropriately adjusting the splitting ratios, and subsequent routing, between the different pathways within the device.

In the embodiment illustrated in FIG. 3 the switching elements 102 comprise balanced interferometers having two equal-path length branches. An electrode is associated with each branch of the switching elements 102 so that a local and variable thermal modification can be imprinted onto the surrounding optical waveguide. Such a thermal modification induced by the electrodes can be controlled electronically via the voltages $V_{NA}$ and/or $V_{NB}$ to induce a phase difference $\Delta\varphi_N$ between the branches of the switching elements 102, thus allowing for tunable switching of the switching elements 102. Controlling the relative phase difference(s) $\Delta\varphi$ of the switching elements 102 allows for selectively directing optical pulses between the different branches of the adjacent delay lines 104, and hence selectively controlling the proportion of optical pulse(s) travelling along the different pathways through the device. Although in this example the splitting ratios between the different branches/pathways are thermally controlled, it may be appreciated that other splitting embodiments could alternatively be obtained by using electro-optic, such as the Pockels effect or plasmonic effects, acousto-optic, or electro-absorption mechanisms, among others. In general, it may be appreciated that the switching elements may take any suitable form that allows for switching of optical signals between the different pathways of the device. For example, the switching elements may alternatively comprise directional coupler-type membrane switches having two parallel channels with membranes associated therewith that can be selectively activated to create a phase shift between the channels to allow/prevent coupling of optical signals between the two channels. As another example, more simply, the switching elements may comprise mirrors with variable reflectivity, and various other suitable examples of optical switching elements may be apparent to those skilled in the art.

Furthermore, the device shown in FIG. 3 may also allow for the indirect control of other correlated properties of the pulse components. For example, the amount of dispersion may also be affected by the effective path length travelled by the optical signal components. Thus, the temporal spreading, such as temporal pulse width, can be modified via dispersion by controlling the propagation length of the signal components. As another example, the spectral shape, for example temporal chirp/phase, of a signal component generally depends on the effective nonlinear propagation length of the signal component in the waveguide, which depends on both the pulse power and overall propagation length in the waveguide material. Thus, again, the spectral shape can be controlled via the routing of the signal components between the different pathways of the device. Thus, by adjusting a single input parameter, for example the splitting ratio of a single one of the delay lines 104, it is possible to change multiple correlated optical properties of the pulse components.

The device illustrated in FIG. 3 may typically be implemented based on integrated optical waveguides. It may be appreciated that this method is not limited to integrated systems, and could also be implemented in fibered and/or free space optical architectures. The complexity of the system intrinsically increases with both the number of independent pulses and the number of degrees of freedom to control, so that integrated systems may present various advantages in terms of cost and/or practicality, especially for the embodiment of "hybrid" waveguide designs as mentioned above. In addition, both bulk and fiber-based systems present intrinsic limitations that may be overcome in an integrated arrangement. For instance, the use of fiber systems is associated with path differences, such as temporal delays for example, that are typically on the order of a few centimeters, such as corresponding to a regime of nanoseconds or over hundreds of picoseconds at best, and thus the temporal resolution and/or reproducibility are strongly limited. In contrast, free space optics can potentially yield finer temporal accuracy in the picosecond/femtosecond temporal range. Nevertheless, the pulse replica that can be generated with such delays typically propagates in the atmosphere, where dispersion and/or nonlinearity cannot be effectively achieved. Thus, additional elements, such as polarizers, pulse shapers, phase shifters, Bragg gratings, etc. for example, may need to be incorporated in order to efficiently control the relative properties of the signal components such as intensity profiles, phases or polarizations, which in an integrated embodiment can be modified by dispersive and/or nonlinear effects as the pulse propagates in the waveguide.

It may be appreciated that the device shown in FIG. 3 need not be configured to introduce (only) relative delays, and that the signal modifying elements 104 may suitably, or alternatively, be configured to modify optical signals in various different ways. For example, by incorporating additional elements, or hybrid materials associated with different, potentially nonlinear, propagation parameters, along the different branches of the delay lines 104 it is possible to introduce differences in effective nonlinear path length, for example via the Kerr effect, or polarization rotation, etc. Such "hybrid" waveguide designs may thus allow for a direct control of other optical properties of the signal components such as relative phase, spectral shape such as for example chirp, wavelength, spectral profile, spectral phase, polarization, etc. The delay lines 104 need not be fixed and the structure of the delay lines, and hence propagation dynamics, may also be thermally, or piezoelectrically, controllable. Furthermore, the optical switching elements need not comprise only two branches, and additional control may be provided by using more than two branches, although this naturally increases the complexity of the system.

Also, the proposed method could be readily combined with additional control systems, for example pulse shapers, modulators, filters, polarization controllers, etc., to lead to further flexibility in the adjustment of the system input parameter space.

It may be appreciated that for such a splitting device the number of paths scales exponentially with the number of delay lines. For instance, again considering delay lines each having only two branches, for a system having N=8 different delay lines, there are now 256 (28) possible pathways through the device. In that case, by appropriately designing the delay structure, for example so that $\Delta T_N = 2\, \Delta T_{N-1}$, it is possible to generate up to 2N optical pulses with adjustable powers and tuneable temporal separations that are multiples of $\Delta T_1$.

Depending on the initial source, the pulses may have durations of the order of femtoseconds, and ultrashort pulse trains may be generated with up to 1 THz repetition rates, with a duty cycle depending on the initial optical source repetition rate, or can be temporally overlapped if the initial pulse duration is larger than the equivalent delay between the pathways followed by different pulse replicas. The system of FIG. 3 therefore allows for a convenient way to drastically expand and easily tune the initial optical parameter space in order to provide the required control of optical processes in various applications (for example those shown in FIGS. 1 and 2).

Figures 4A, 4B, 4C:
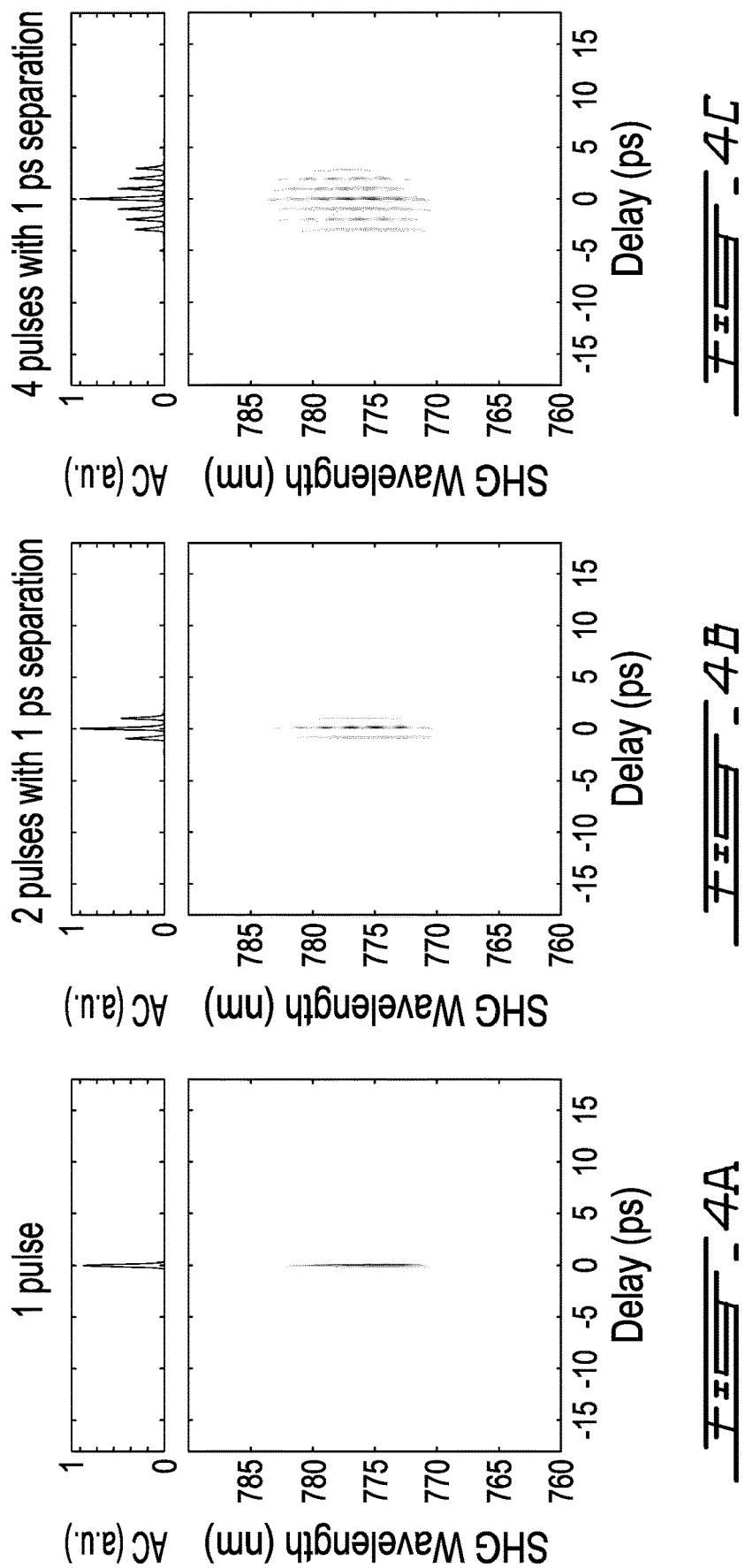
FIG. 4A, FIG. 4B, FIG. 4C show the intensity autocorrelation trace.

FIG. 4 show characterization of optical pulse bunches generated from the integrated delay line sample having N=8 different delay lines, illustrating how bunches of optical pulse replicas may be generated with adjustable numbers of pulses and/or relative delays; for each configuration, FIG. 4A, FIG. 4B, FIG. 4C show the intensity autocorrelation trace; and FIG. 4D, FIG. 4E, FIG. 4F show the corresponding Frequency Resolved-Optical Gating trace (FROG) trace, providing a spectrogram of the pulses second harmonic generation (SHG). In this case, multiple pulse distributions, up to 16, with equal power but different temporal separation can be obtained by setting each of the 4 interferometers at only 3 definite splitting ratios: 0%, 50% or 100%. Note that the pulses used in this example have a 120 fs duration, and the triangular-like shape in the autocorrelation trace highlight that pulse replicas here possess very similar power.

It may thus be appreciated that in using such a temporal pulse splitting method, temporal delays can be finely adjusted to values as low as 1 picosecond, although smaller values could be achieved, only limited by the unbalance of the waveguides and their dispersion to potentially avoid temporal overlap between adjacent pulses. In addition, further control of the individual pulse powers can be achieved through the use of the splitting ratios, continuously adjustable within the range 0-100%. Although all the individual pulse powers cannot be, strictly speaking, adjusted independently, as a given element setting may influence subsequent pulse splitting throughout the waveguide path, the method disclosed here provides a versatile means to shape the bunches of optical pulses with large flexibility. Noteworthy, even in this relatively simple embodiment, the splitting ratios of the N=8 beam splitting elements may each be individually controlled over 32000 levels each, so that more than 1040 different ensembles of pulse replicas, associated with different properties such as power, shape/chirp, etc. for example, may be generated that can be readily used to control the dynamics of their subsequent nonlinear propagation in order to optimize their corresponding output spectral or temporal characteristics.

Thus, it may be appreciated that the embodiment described in relation to FIG. 3 provides an extremely flexible and versatile device that is capable of providing a high amount of control over the optical output. In particular, this embodiment allows control of multiple degrees of freedom of the pulses output, and additionally allows for the control of correlated parameters, for example adjusting only the pulse path—equivalent to the propagation length—one can modify both the pulse intensity shape via dispersion and its corresponding chirp via nonlinearity. For an efficient control of various nonlinear processes where the parameters and/or underlying dynamics might be unknown, the device may be used in combination with adaptive feedback control, such as via machine-learning concepts, for example as shown in FIGS. 1 and 2, to offer an automatic optimization of the system, such as of the pulse replica parameters, towards the desired characteristics for the end-user. For example, an iterative optimization algorithm, for example deep learning, decision tree learning, Bayesian networks, genetic/evolutionary algorithms, etc., may be used to perform a search in the initial parameter space, such as the splitting ratio of the switches in the temporal pulse splitter. This in turn allows modification of the abovementioned individual pulse replica properties, including for example power, pulse shape/chirp, relative delay, etc., in order to control the complex nonlinear processes and thus optimize the output of the system.

Figure 5:
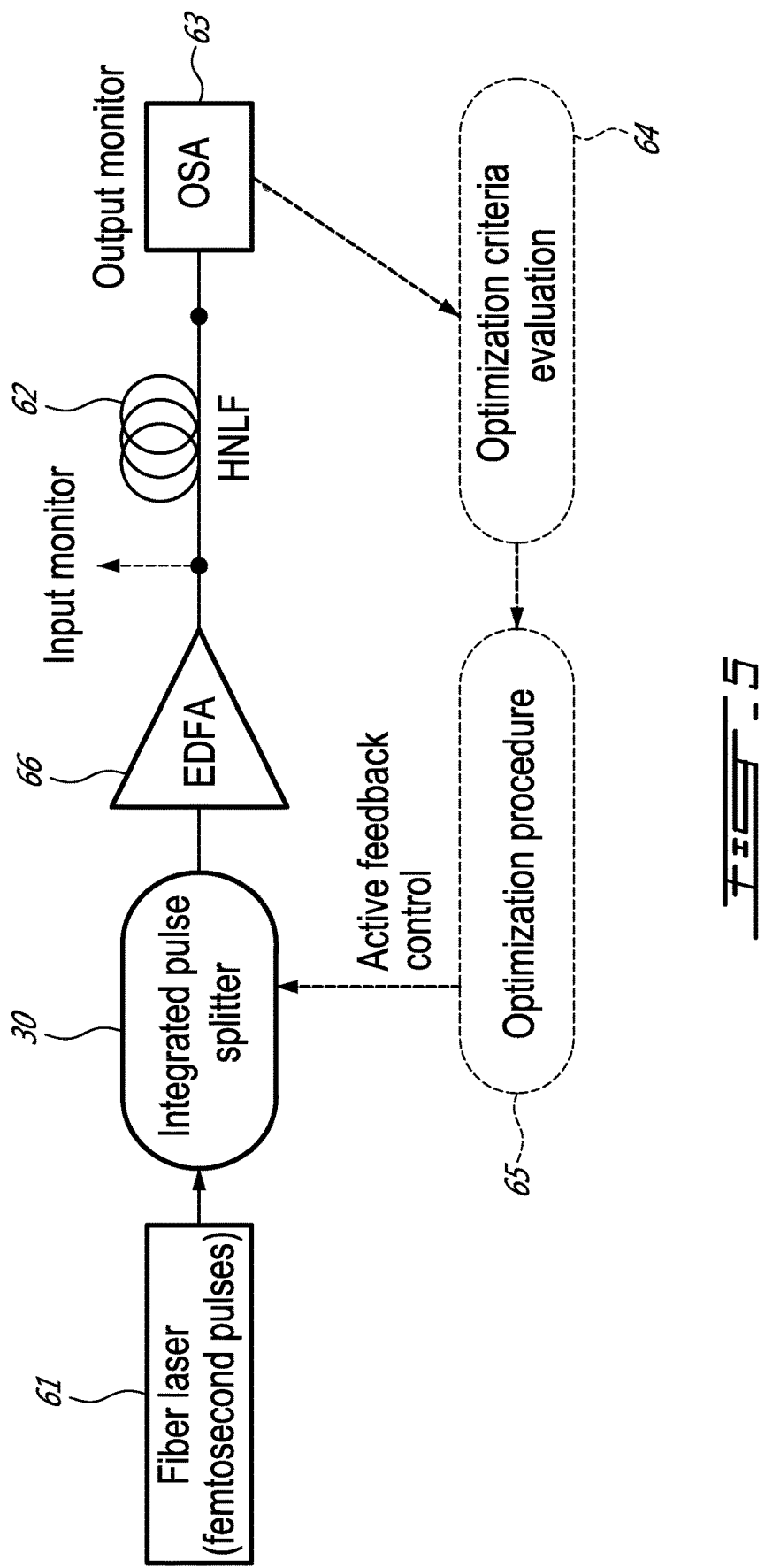
FIG. 5 is a schematic of a system for 'on-demand' supercontinuum generation according to an embodiment of an aspect of the present disclosure.

FIG. 5 is an example of a system used for proof-of-principle experiment of 'on-demand' supercontinuum generation. The femtosecond laser pulses are injected into the integrated pulse splitter to generate multiple optical pulse replicas with tunable power and relative delay. After amplification with an erbium-doped fiber amplifier (EDFA), the pulses are injected into a 1 km-long highly nonlinear fiber (HNLF). The output is here monitored spectrally using an optical spectrum analyzer (OSA). The spectrum is measured, and corresponding optimization criteria are set, for example maximal spectral intensity at a given wavelength/multiple wavelengths, so that modification of the splitter parameters, such as splitting ratios, are done iteratively based on an optimization procedure, a genetic algorithm in this case. The procedure is repeated until convergence towards the selected optimization criterion(a). Here, femtosecond laser pulses are injected into an integrated pulse splitter device 30 by a laser 61 in order to generate multiple optical pulse replicas with tunable power and relative delay. After optional amplification with an erbium-doped fiber amplifier (EDFA) 66, the pulses are injected into a 1 km-long highly nonlinear fiber (HNLF) 62. The output is monitored spectrally for example using an optical spectrum analyzer (OSA) 63. The spectrum is measured and corresponding optimization criteria 64 are set, for example maximal spectral intensity at a given wavelength/multiple wavelengths, so that modification of the splitter parameters (such as splitting ratios) can be performed iteratively based on an optimization procedure 65. The procedure is repeated until convergence towards the selected optimization criterion(a).

In the regime considered here, such as sub-picosecond pulses propagating in the anomalous dispersion regime of the fiber, coherent supercontinuum generation is typically mediated by deterministic soliton ejection from the initial input optical pulse(s). The ability to generate and control the properties. Including for example power, shape, chirp, etc., of multiple input pulses via the proposed temporal pulse splitter thus constitutes a perfect example illustrating the potential of the systems and methods presented herein to optimize complex optical phenomena.

Figures 6A, 6B:
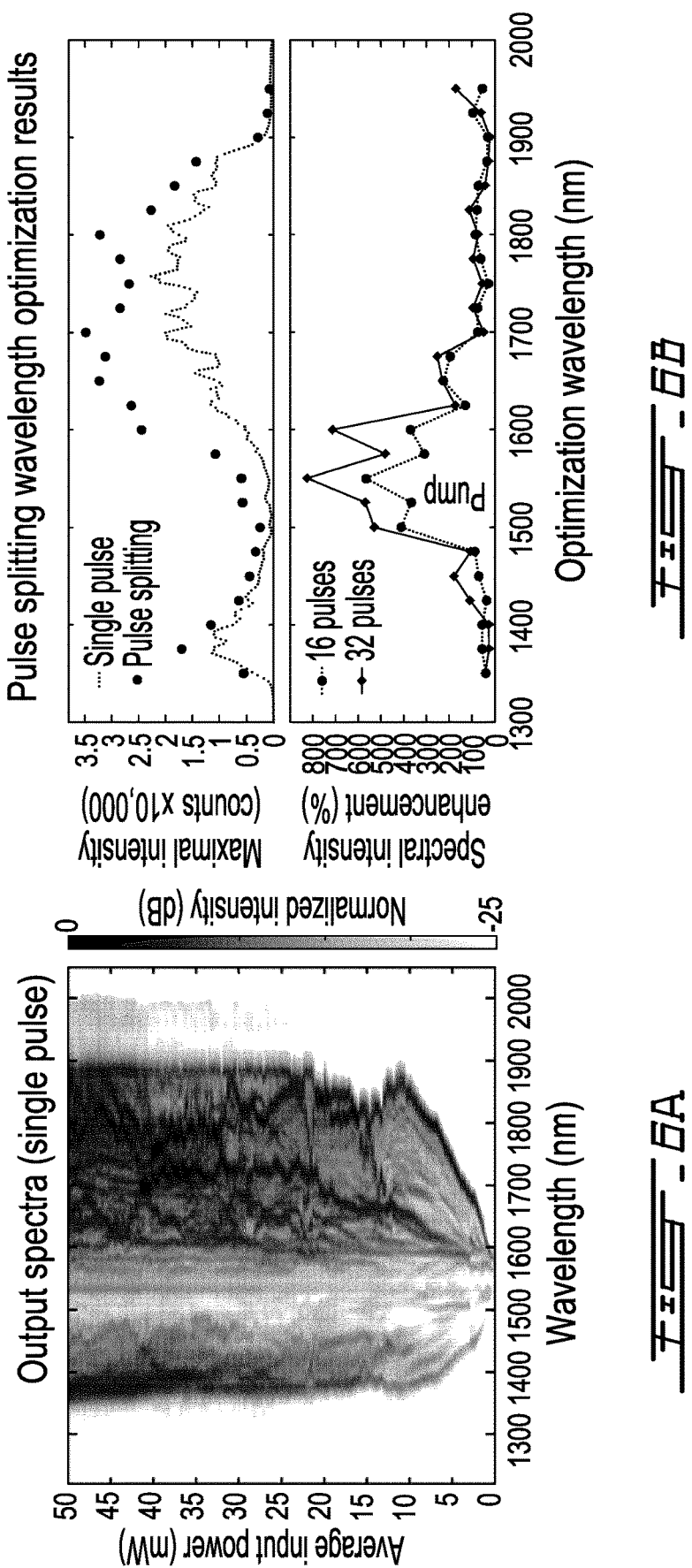
FIG. 6A shows the spectral intensity output obtained by tuning the power of a single input pulse.
FIG. 6B shows the spectral intensity optimization as a function of the target supercontinuum wavelength.
Figures 6C, 6D, 6E, 6F:
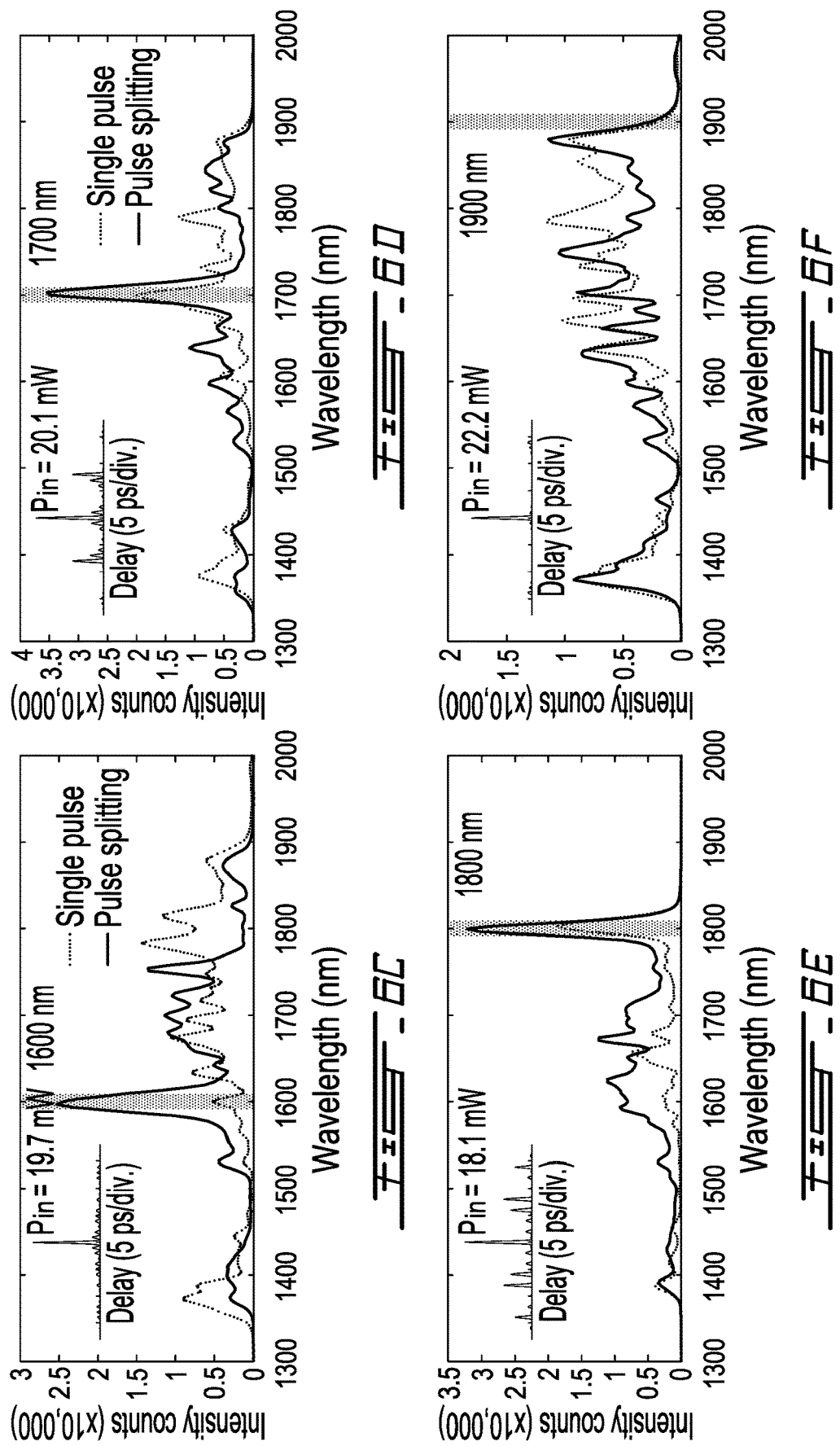
FIGS. 6C, 6D, 6E and 6F show a comparison of the spectra obtained through optimized pulse splitting (solid line) and for the optimal case measured using a single pulse case (dashed line); inset panels in FIGS. 6C-6F show the autocorrelation trace of the optimal input pulse train reached after optimization.

For instance, using a genetic algorithm to iteratively modify the splitting ratio of the temporal pulse splitter elements without prior knowledge of the system parameters, and a constant optical power budget, the spectral intensity at a target wavelength can be efficiently enhanced compared to the optimization obtained using only a single pulse, such as just varying the input power of the initial single pulse. For instance, FIG. 6A shows the spectral intensity output obtained by tuning the power of a single input pulse. FIG. 6B shows the spectral intensity optimization as a function of the target supercontinuum wavelength. The upper panel of FIG. 6B is a comparison of the output spectral intensity measured without (dashed line) and with 16 pulses splitting optimization (dots). The lower panel of FIG. 6B shows the normalized intensity enhancement at each wavelength relative to the optical spectral intensity recorded from single pulse seeding with the same power budget. The lower trace (dots) shows the result of optimization using 16 pulses, such as using N=4 splitting elements, and the upper trace (diamonds) shows the result of optimization using 32 pulses, such as using N=5 splitting elements. FIGS. 6C-6F show a comparison of the spectra obtained through the optimized pulse splitting method (solid line) and for the optimal case measured using a single pulse case (dashed line). The target wavelengths are illustrated by the shadings. Note that both measurements use the same power budget, up to 50 mW average input power, for the three targeted wavelength optimizations. The inset panels in FIGS. 6C-6F show the autocorrelation trace of the optimal input pulse train reached after optimization.

Such spectral optimization is obtained using only up to 16 pulses with a minimal delay of 1 picosecond, such as only activating four beam splitting elements over the 8 available, and typically reached after 5000 iterations, such as ~10 generations including a population of 500 individuals. Noteworthy, over the whole supercontinuum spectral bandwidth, between about 1350 nm and about 1950 nm, a spectral enhancement is obtained ranging from 20 to 600% depending on the target wavelength (see FIG. 6B). Further measurements held with up to 32 pulses. with five beam splitting elements activated, show similar spectral intensity enhancement over the whole supercontinuum spectrum, with additional spectral intensity enhancement reaching up to about 700% when considering the central spectral components of the supercontinuum.

Figure 7A:
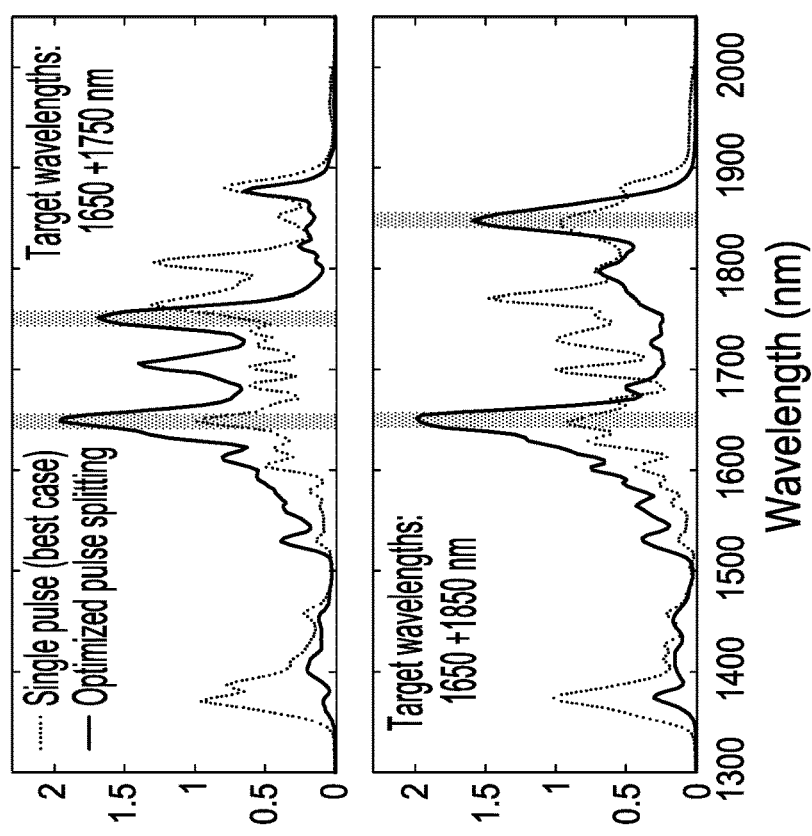
FIG. 7A and FIG. 7B show examples of dual-wavelength spectral intensity optimization using the same setup and power budget as in FIG. 6.
Figure 7B:
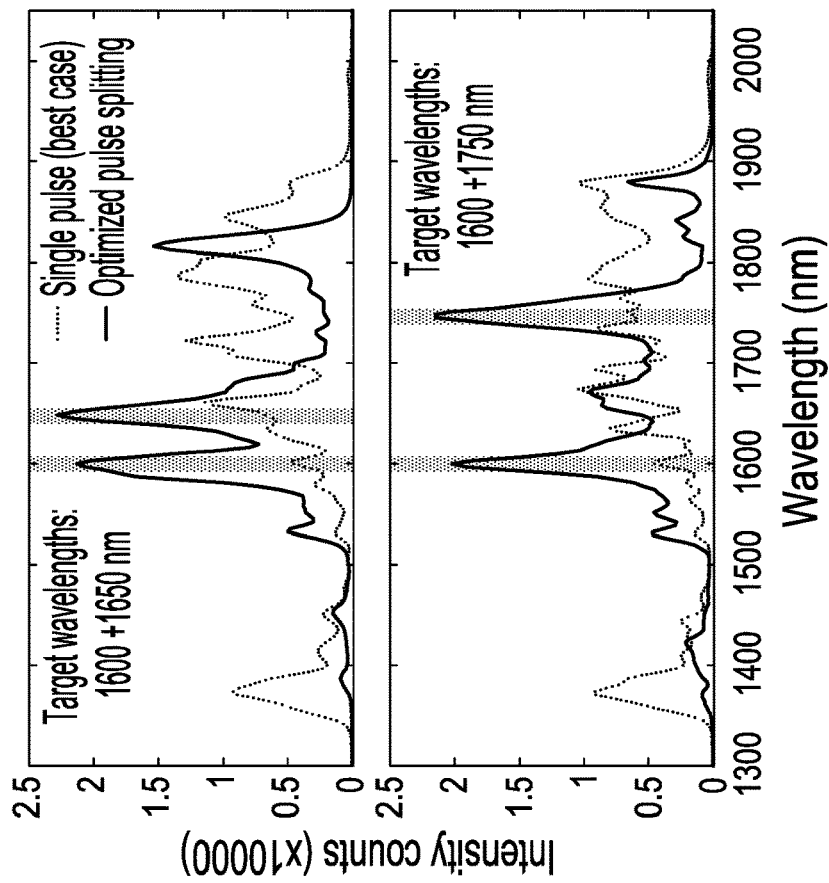
Figure 7C:
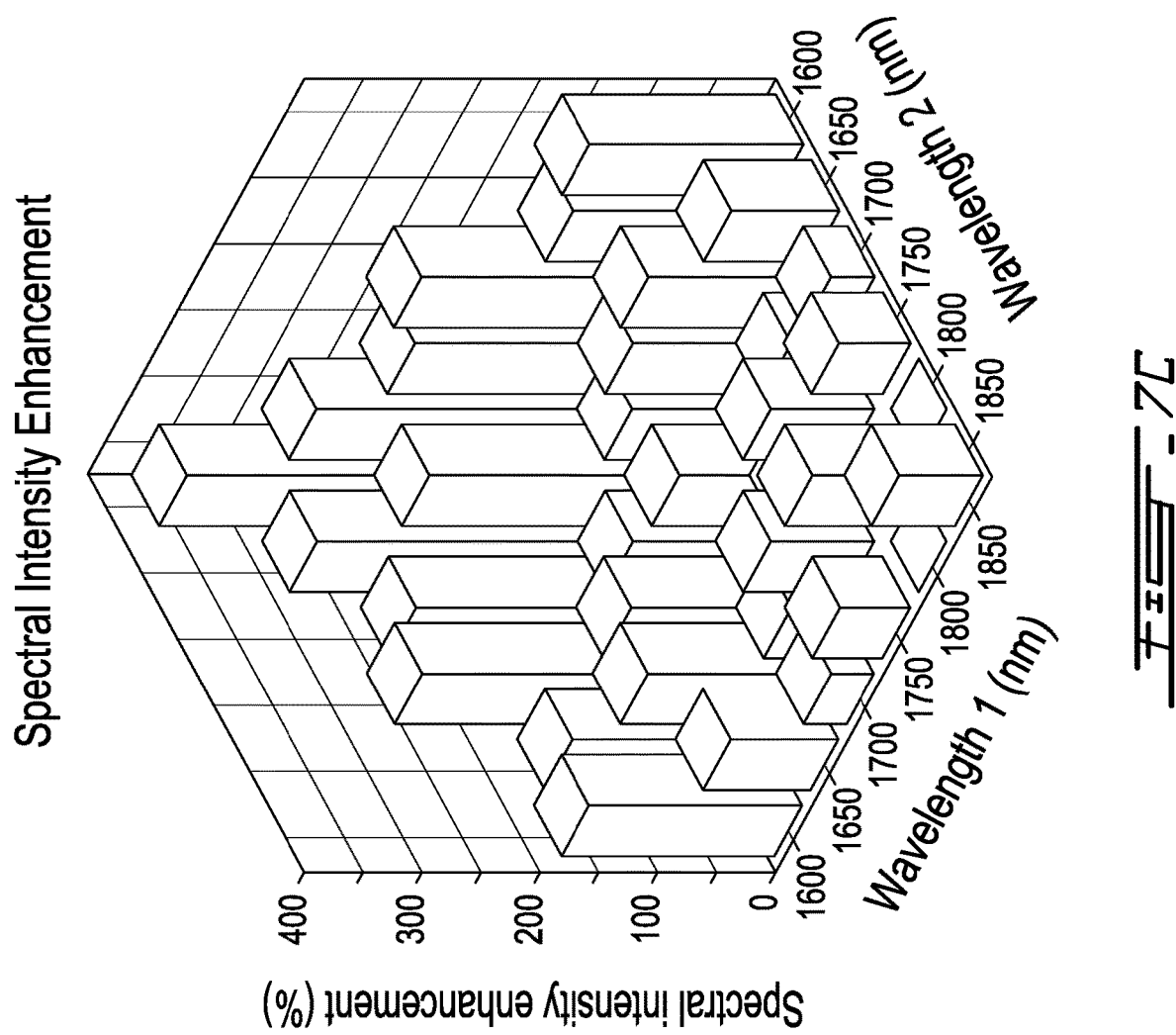
FIG. 7C shows a histogram of normalized intensity enhancement for various pairs of wavelength combinations.

The method and system presented herein also allow for the conjoint optimization of multiple independent optimization criteria, such as multiple wavelengths' intensities. Indeed, any targeted optimization function can in principle be implemented. FIG. 7 show examples of spectral outputs and spectral intensity enhancement results obtained when running the algorithm using various combinations of two wavelengths as optimization criteria, wavelengths being here constrained to the range between about 1600 nm and about 1850 nm with 50 nm discrete steps for simplicity. In this case, the optimization mechanism may also be constrained so that the intensity at one given wavelength is similar to the intensity of the other wavelength; in particular, results are shown where the intensity at one wavelength is no more than twice the intensity at the other wavelength. FIG. 7A and FIG. 7B show a comparison of the output spectral intensity measured without (dashed line) and with (solid line) 16 pulse splitting optimization. FIG. 7C is a histogram showing the normalized intensity enhancement for various pairs of wavelength combinations. The enhancement is calculated as the average intensity at both wavelengths, and normalized relative to the optimal spectral intensities recorded from single pulse seeding with the same power budget. FIG. 7 show only results where the intensity at one wavelength is no more than twice larger than the intensity at the other wavelength, although more versatile optimization results can readily be obtained with such a method (see FIGS. 9 and 10).

In FIGS. 7A and 7B, the output spectral intensity measured without (black lines) and with 16 pulses splitting optimization (red dots) are compared. Target wavelengths are illustrated as shadings. The results reported in FIG. 7 illustrate how the methods described herein may efficiently and independently optimize two predetermined criteria, without the need for a priori knowledge of the system parameters or extensive numerical simulations and/or design iterations in the system. In this dynamical regime of supercontinuum generation, the large spectral lobes in the spectra correspond to so-called temporal solitons ejected from either one or multiple pulses from the initial bunch set. As the relative delays between the initial pulses can be adjusted over a significantly large window, it may also be possible to control the temporal delay between the solitons generated at the fiber output. This may in turn pave the way to direct applications in the design of for example integrated pump-probe measurements systems, spectro-temporally resolved measurements, hyper spectral imaging, or other suitable applications.

The methods presented herein enabling the efficient tuning of multiple variables in the parameter space therefore represent a powerful alternative for the optimization of supercontinuum generation, as well as for similar complex dynamics observed in a variety of ultrafast nonlinear systems.

In the methods specifically described above, the evolutionary algorithm settings were constrained in order to provide a suitable supercontinuum in a reasonable time frame. In particular, even when a complete switching was set to five beam splitting elements in the optical pulse splitting device, such as changing the pulse path from 0 to 100%, the predominant spectral modifications were stable and reproducible after only a few hundred milliseconds settling time, including the response time of the electronic driver and spectrometer.

Figures 8A, 8B:
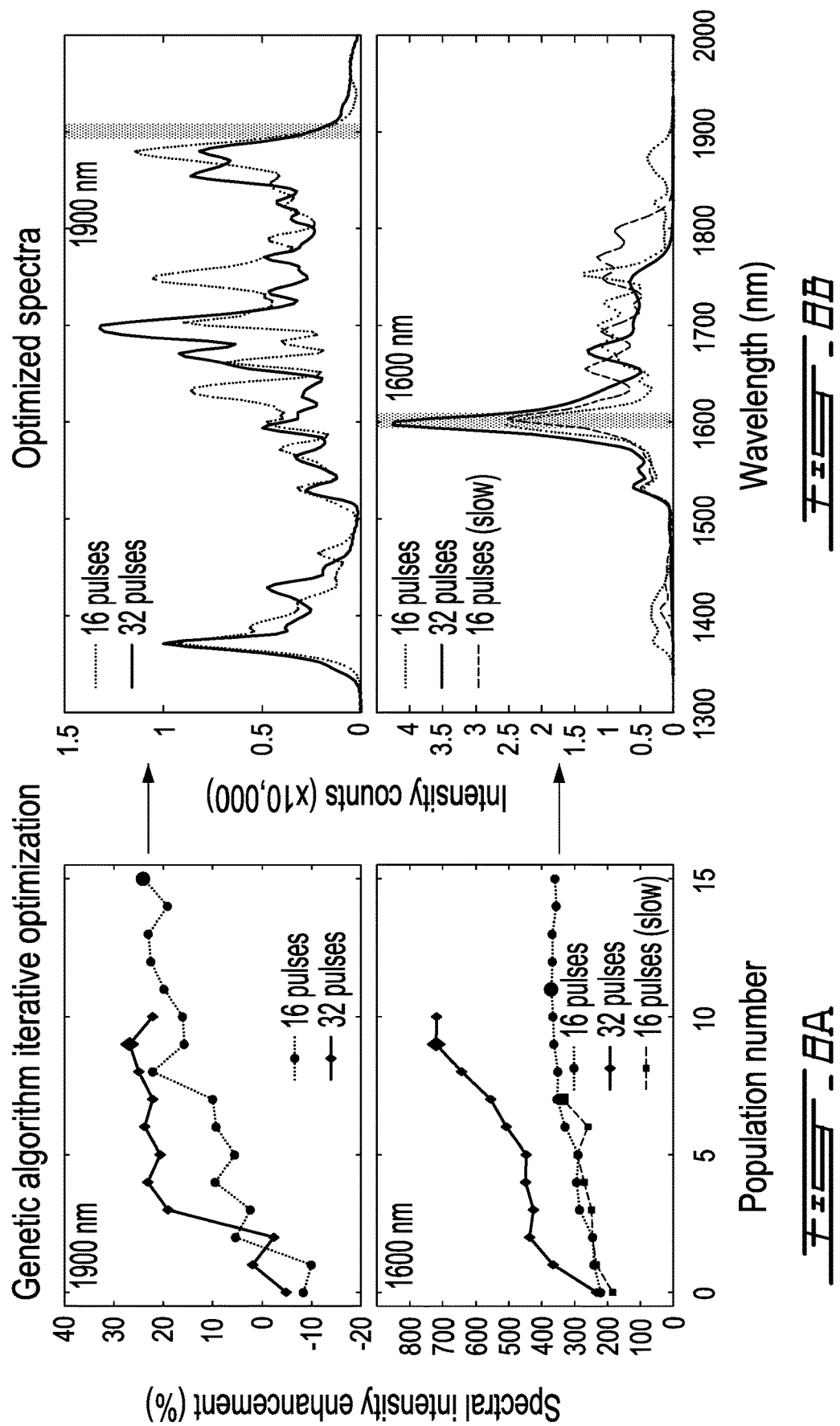
FIG. 8A shows the evolution of the spectral intensity enhancement.
FIG. 8B shows optimal spectra for an optimization processes with a target wavelength at 1900 nm (top panel) and 1600 nm (bottom panel) corresponding to FIG. 8A.

FIGS. 8A and 8B illustrate typical evolutions of the genetic algorithm iterative process for different parameters and target wavelengths and show that consistent results may be obtained considering a settling time as low as 250 milliseconds. In particular, FIG. 8A shows the evolution of the spectral intensity enhancement and FIG. 8B shows the corresponding optimal spectra for an optimization processes with a target wavelength at 1900 nm (top panel) and 1600 nm (bottom panel). The lower trace shows the genetic algorithm optimization when four beam splitting elements were activated in the sample, using 16 pulse replicas, and their splitting ratio actively adjusted for 15 generations of 500 individuals and a settling time of 250 ms. The upper trace shows similar results when five beam splitting elements were activated in the sample, using 32 pulse replicas, and their splitting ratio actively adjusted for 10 generations of 1000 individuals and a settling time of 250 ms. An example of genetic algorithm optimization considering a longer settling time, in this case 3 s, for four beam splitting elements activated, using 16 pulse replicas, and adjusted for 7 generations of 500 individuals is also shown for comparison (dashed line).

In the first example, with a target wavelength set to 1900 nm, it can be seen that similar optimization results are obtained regardless of the number of beam splitting elements activated. This is due to the fact that, at such a wavelength, a soliton with a minimal power need to be ejected during HNLF propagation of the input pulse replicas. In this case, the potential spectral optimization is therefore extremely limited, at about 25%, by the overall power budget of the initial bunch of pulses, as well as from increasing fiber attenuation at wavelengths meth ding 2000 nm. In the second example, the spectral intensity enhancement obtained at 1600 nm is already significant using only 16 pulse replicas optimization, at about 370%, and reached after only few generations. At this wavelength, it can be observed that an approximately two-fold spectral intensity enhancement, of about 750%, can be readily obtained using an optimization based on 32 pulse replicas. Increasing the number of pulse replica generated from our integrated splitter, one is therefore able to drastically enhance the power spectral density at this wavelength via controlled soliton ejection from each pulse replica, such as in a way similar to using a pump laser with increased repetition rate.

For this wavelength, genetic algorithm optimization was also performed using longer settling times between various iterations of the integrated splitter thermal adjustments. In FIGS. 8A and 8B (bottom panels), an example is also provided of such an optimization procedure with a 3 second settling time, clearly illustrating that the previous optimization results are consistent, with about 350% for 16 pulses replicas. Comparable results (not shown) were also observed for other wavelength optimization procedures and/or variable settling times, in the range 100 ms-20 s.

Further tunability in the supercontinuum may also be obtained from multiple pulse seeding compared to the single pulse case. As mentioned, a key aspect here relies on the fact that each pulse replica properties can be tuned almost individually, besides the limitations induced by the integrated splitter structure where each element can introduce correlations in the power and/or properties of previously generated replicas when split, and propagating in the subsequent unbalanced waveguides. Besides the ability to control both temporal and spectral location of the radiated solitons, an example or our method versatility is illustrated from the dual wavelength optimization shown in FIG. 7. Indeed, FIG. 7 present only the optimized supercontinuum where the two target wavelengths possess similar intensities, where the intensity at one wavelength is no more than twice larger than the intensity at the other wavelength. The optimization of multiple objectives clearly unravels the potential of our pulse splitting method, allowing to further control the intensity at each wavelength of the supercontinuum.

Figure 10A:
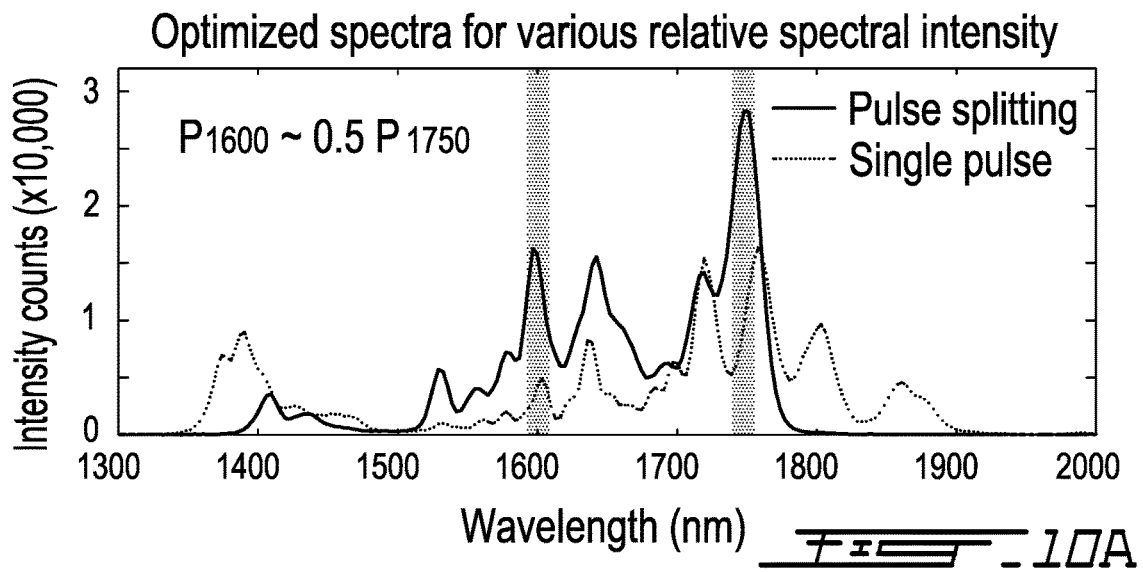
FIG. 10A, FIG. 10B and FIG. 10C show spectra obtained for dual wavelength optimization with various relative spectral intensities corresponding to FIG. 9.
Figure 10B:
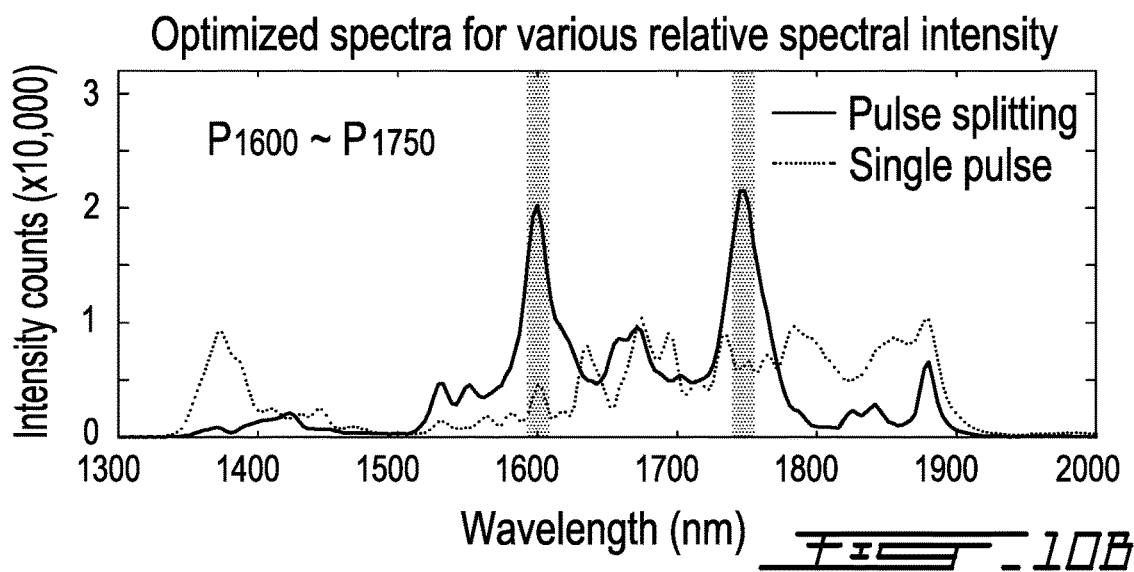
Figure 10C:
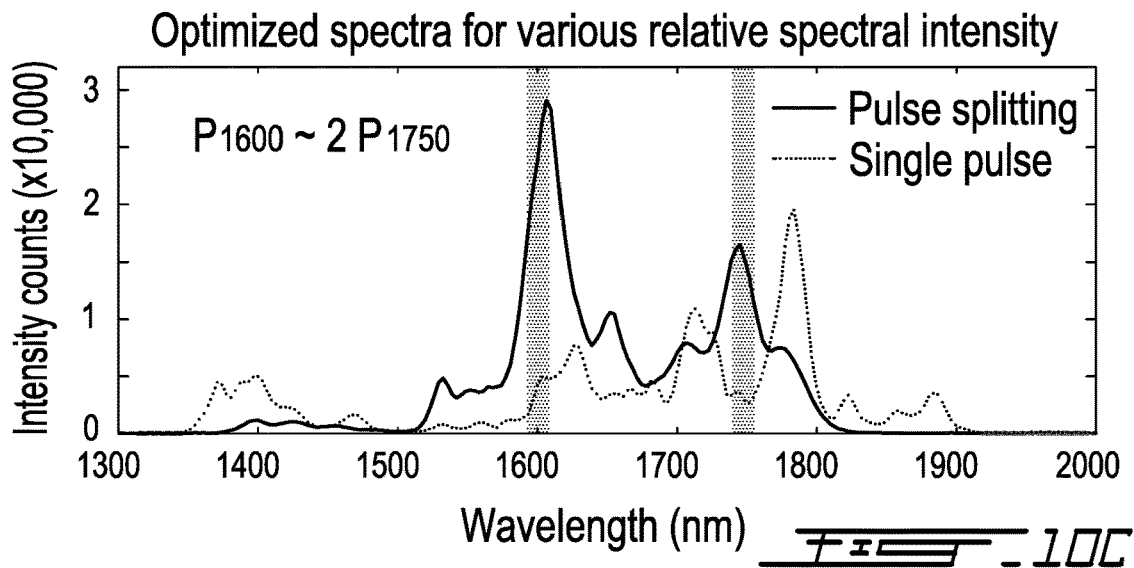

Such aspect is illustrated in FIG. 9 where the optimization results are presented in the form of a Pareto front. In this case, the weight of each optimization criterion, such as the spectral intensity at each respective wavelength, can be post-selected to adjust the respective intensity at each optimized wavelength. Typical spectra obtained for dual wavelength optimization with various relative spectral intensities are shown in FIG. 10. FIGS. 9 and 10 thus show the experimental results for a multiple objective optimization-based genetic algorithm, in particular for dual wavelength intensity optimization at 1600 nm and 1750 nm. FIG. 9 is a Pareto front showing the optimal set of spectral intensities at 1600 nm and 1750 nm retrieved by using a 16 pulse splitting optimization (the upper set of black dots) and compared with the optimal cases measured using a single input pulse with variable power (the lower set of grey dots). The scatter plot displayed in FIG. 9 was separated in three domains, as indicated by the dividers, corresponding to different relative intensities between the two optimized wavelengths (see domain boundaries illustrated as dashed lines). For each domain, the best results from the genetic algorithm optimization obtained by analysis of the Pareto front, as well as from a single input pulse scenario have been extracted, and the corresponding spectra are shown in FIG. 10.

Again, it can be readily observed that the control of the spectral intensity at both wavelength of interest is not easily addressed when considering only a single input pulse with adjustable power, as seen by the highly skewed scatter distribution of the results obtained using a single input pulse in FIG. 9. On the other hand, a clear intensity enhancement along with a selective control of the power distribution between the two wavelengths of interest can be readily achieved using the methods described herein. Such results further highlight the versatility of the proposed pulse splitting scheme as an efficient tool for the control of supercontinuum generation properties without specific knowledge of the nonlinear system's underlying dynamics.

Apart from the illustrative examples presented above, it may be appreciated that the methods presented herein may also find direct applications in various other optical systems with complex dynamics such as optical cavities and/or 'smart lasers', where optimized emission and/or efficient mode locking is highly desirable (see example in FIG. 2). The addition of suitable optical elements in the proposed laser systems may allow the observation and optimization of new lasing mechanisms. For instance, the temporal pulse splitter can allow light propagation with different optical paths in the photonic waveguides. By potentially using additional elements, for example filters, saturable absorbers, lasing systems with dual (or multiple) repetition rates and/or lasing wavelengths, such as, for example, in optical parametric oscillator and/or dual frequency comb generation, may be implemented.

In accordance with a first aspect of the present disclosure, there is provided a method for controlling an output of a complex for example nonlinear or chaotic optical system, the method comprising: generating a plurality of optical signal components having different optical properties, and passing the generated optical signal components as input to an optical system comprising an optical device and/or medium, wherein the output of the optical system is based on interactions of the signal components within the optical device and/or medium, and wherein the relative proportions of the optical signal components that are generated as well as the individual optical properties thereof are selected or controlled to control the output of the optical system.

The present disclosure also extends to complex for example nonlinear or chaotic optical systems and apparatuses in which such methods can be implemented. Accordingly, from another aspect there is provided an optical apparatus comprising: a signal preparation device that is operable to generate a plurality of optical signal components having different optical properties; and an optical system comprising an optical device and/or medium to which the optical signal components generated by the signal preparation device are provided as input in order to generate an output of the optical system, wherein the output of the optical system is based on interactions of the signal components within the optical device and/or medium, and wherein the signal preparation device can be configured to select or control the relative proportions of the optical signal components that are generated as well as the individual optical properties thereof, and to thereby control the output of the optical system.

Thus, there is provided a method and a system for controlling the output of complex, for example nonlinear or chaotic, optical systems that provides an enhanced parameter space that can be explored in order to optimize the output of the optical system for a particular end-user or specific application. The present methods may thus provide a high degree of control and tunability over the output of the optical system, in turn allowing for the realization of novel and versatile optical systems, or optical sources, for use in a wide range of optical applications.

In particular, the method presented herein involves the generation of multiple optical signal components each having different, and variable, optical properties that can be selected or controlled individually. By appropriately selecting or controlling the relative proportions of the different optical signal components that are generated, as well as selecting or controlling (multiple of) the optical properties of the individual optical signal components, the output of the optical system can be adjusted accordingly, for example to optimize the output towards a target characteristic or criterion(a) for a particular application. That is, the optical signal components, and the individual properties thereof, may offer a relatively large, enhanced parameter space that can be explored in order to reach configurations for the optical state of the system that would otherwise be difficult, or even impossible, to access. For instance, in embodiments, this parameter space may be conveniently explored using an adaptive optimization method, for example an evolutionary algorithm, to reach a substantially optimized configuration. Generating more, or different, optical signal components, and/or adjusting the properties of the optical signal components that are generated, thus provides a highly versatile and scalable method for finely controlling, or tuning, the output of an optical system.

Although the present methods may generally find application within any suitable and desired optical systems, the improved possibilities for control over the optical output that are achievable through an enhancement of the parameter space as described herein find particular utility for the control of optical systems that rely on complex, for example nonlinear or chaotic, processes, for which the underlying parameters or dynamics might be unknown, and that would therefore otherwise be difficult to reliably and efficiently tune or optimize. That is, the output of such systems is typically determined based on complex, for example nonlinear or chaotic, interactions of the optical signals within the system. According to the present method, these interactions, and hence the output of the optical system can be controlled, optimized, by a process optimizing the input optical signals provided to the system.

A "complex" system may generally be considered as any system in which the output is determined based on complex interactions within the system, for example multiple mode interactions, conjoint and/or interdependent physical effects, for example dispersion, scattering, absorption, nonlinearity, stochasticity and noise dependence, and which therefore has a non-trivial transfer function, typically hampering the determination and retrieval of the initial conditions based on a simple back propagation of the characterized system output. For example, an example of a complex system may be a chaotic system. As another example, a complex system may be a nonlinear system. It may be appreciated that a "nonlinear" system is a system in which the light exhibits nonlinear behavior. Thus, in embodiments, the optical system that is being controlled is a complex and/or nonlinear optical system—such as having a complex or nonlinear transfer function. It may be appreciated that the methods presented herein may thus represent a significant improvement compared to other, alternative methods for controlling optical systems.

For example, one alternative method for controlling an optical system might be to attempt to carefully characterize the optical system, for example the propagation medium and/or optical source, and then analytically or numerically determine the design criteria for the system, for example supercontinuum source, laser cavity, etc., based on a priori knowledge of the physical processes underlying the system. This may in turn allow the selection of suitable parameters for obtaining the desired dynamics and thus the corresponding optimization of the system output by sweeping the input parameter space. The efficiency of this method and the tunability of the system are both significantly limited compared to that of the methods presented herein. For instance, in this alternative method, a perfect knowledge of the system processes would be required in order to determine, for example, the type of input optical pulse to be used for a given propagation medium, or vice versa. In addition, such a passive method fundamentally limits the versatility of the system and can be impractical, or even impossible, as new propagation medium parameters need to be determined, and/or fabricated, if one needs to modify the input optical source, or if one decides on a new type of output optimization.

A different method might be to employ various post-selection methods. That is, the optical system may not be designed to provide a specific output at all, but the output may instead be post-processed, for example filtered, towards this end. For example, if multiple different individual wavelengths need to be used from a generated supercontinuum spectrum, for example for fluorescence, OCT or imaging applications, one method would be to generate an ultra-broadband spectrum and subsequently filter the output to leave only the wavelength(s) of interest. In this case, though, the overall process is typically highly inefficient as a large amount of the power is wasted by generating spectral components that are ultimately not used. Furthermore, the tunability is still fundamentally limited by the initially generated spectrum, as well as the available filters, and may not be appropriate for the application at hand.

Overall, existing methods for controlling complex optical systems generally present various limitations in terms of specificity, power efficiency, cost, handling and/or for the viable control of an extended parameter space, such as controlling multiple, independent, and different degrees of freedom in the initial conditions. At least in embodiments, the methods presented herein may help to overcome some of these limitations, allowing for the realization of more versatile, adjustable optical sources and systems within relatively compact forms, and potentially providing various advantages in terms of complexity management, power consumption, costs and handling.

The optical signal components that are generated, by the signal preparation device, may take various suitable forms for example depending on the form of the initial input optical signal(s) provided to the optical apparatus, typically to the signal preparation device. In general, the optical apparatus may act on any suitable (input) optical signal as desired, including, among others, continuous wave signals, broadband signals and/or noisy signals, such as Amplified Spontaneous Emission signals. The input optical signal may comprise an optical pulse such that the generated optical signal components comprise pulse components, or pulse "replicas", having different pulse properties. In this case, the optical source may be controlled in order to adjust the properties of the input optical pulse. This may provide a further means for controlling the output of the optical system. For instance, the pulse properties, for example power, duration, etc., of the input optical pulse may be adjusted in combination with the adjustment of the signal preparation device in order to further modify or determine the optical properties of the resulting individual optical signal components, and hence the optical output. The optical apparatus may generally be used with any suitable optical source. In embodiments, the optical apparatus further comprises an optical source for providing an input optical signal from which the signal components are generated. That is, an optical source may be provided for providing an input optical signal to the signal preparation device, which then acts on the input optical signal to generate the plurality of optical signal components. The optical source may comprise any suitable light source, as desired. For example, the optical source may typically comprise a laser.

In general, the different optical signal components may be characterized according to one or more optical properties including, among others: relative delay, relative phase (linear), pulse power, pulse shape, pulse phase, wavelength, spectral shape, spectral phase, polarization, etc.

The present methods, in embodiments, may involve controlling multiple optical properties, for example multiple of the optical properties listed above, for each individual optical signal component.

The optical apparatus may comprise a signal preparation device for generating the plurality of optical signal components and for controlling the relative proportions and optical properties thereof. That is, a signal preparation device may be provided that is operable to control the relative proportions of the different optical signal components, as well as the individual optical properties of the optical signal components that are generated. The methods described herein may thus generally comprise using such a signal preparation device to generate the plurality of optical signal components. The output of the signal preparation device, such as the signal components, are provided as input to the optical system and optimized to control the output thereof. In some cases, the output of the signal preparation device may be a single optical component. For most complex)optical systems, gaining access to the optimal systems conditions may typically require the generation of multiple different signal components by the signal preparation device.

In embodiments, different optical signal components, with different optical properties, can be used to independently modify the output of an optical system. For instance, the individual properties of the different optical signal components can be tuned, and each of these signal components can be used to independently control one aspect, or optimization criterion, of the output of the optical system. In this case, it is typically the interactions of the individual signal components within the optical device and/or medium of the optical system that may determine the output. It is also contemplated that the different optical signal components may be caused to interact with one another, either within the signal preparation device, or within a downstream optical device and/or medium through which the generated signal components are passed, to modify the output of the optical system in an interrelated manner. That is, not only can the individual properties of the different optical signal components be tuned to control the optical output, but the interactions between multiple different optical signal components can be used conjointly to control one or more aspect(s), or optimization criterion(a), of the output of the optical system. This may offer further possibilities, or further enhance the available parameter space, for controlling the output of the optical system.

It is contemplated that the optical apparatus, and particularly the signal preparation device, may be pre-configured, such as so that the relative proportions and individual properties of the optical signal components that are generated are pre-adjusted and fixed for a particular application, for example following a prior optimization or calibration procedure. In embodiments, the methods presented herein involve varying, for example in use, or during an optimization step, the relative proportions of the optical signal components that are generated as well as the individual optical properties thereof. That is, the methods may further comprise a step of actively selecting or adjusting the relative proportions of the optical signal components that are generated as well as the individual optical properties thereof to control the output of the optical system. This adjustment may be performed prior to use, for example as part of a calibration or optimization procedure, or may be performed dynamically, for example during an optical experiment. Thus, the methods may comprise dynamically selecting or adjusting the relative proportions of the optical signal components that are generated as well as the individual optical properties thereof to control the output of the optical system.

Similarly, the signal preparation device of the optical system may be re-configurable or adjustable to vary the relative proportions of the optical signal components that are generated as well as the individual optical properties thereof. For instance, the optical system may further comprise a controller for controlling the signal preparation device to adjust the relative proportions of the optical signal components that are generated as well as the individual properties thereof. The controller may take various suitable forms, as desired, and the signal preparation device may, for example, generally be controlled either electrically, optically and/or electronically. For instance, the controller may comprise suitable control circuitry for electrically or optically controlling the signal preparation device and/or may comprise one or more processors suitably configured to electronically control the signal preparation device.

The signal preparation device may, at least in part, be controlled or controllable manually by a user. The enhanced parameter space that is offered by the multiple, and variable, optical signal components lends itself to automatic feedback control, and particularly to the embodiment of machine-learning concepts. For example, as described above, many optical systems rely on fundamentally complex physical interactions that are difficult to model analytically or numerically, and for which the optimization process is therefore non-trivial. Although a user may be able to obtain some improvement for example through trial-and-error, this may generally be very inefficient due to the potentially vast parameter space that is available and the complex nature of the system.

Thus, the methods presented herein may, in embodiments, comprise automatically adjusting the relative proportions of the optical signal components that are generated as well as the individual optical properties thereof in order to adjust the output of the optical system towards a target output for example using a feedback mechanism or feedback circuitry. For instance, where one is provided, the controller may comprise a feedback mechanism or feedback circuitry for controlling the signal preparation device to adjust the output of the optical system towards a target output (criterion(a)). In general, any suitable feedback mechanism or circuitry may be used, including electrical and/or optical feedback mechanisms. The feedback mechanism or circuitry may comprise an optimization algorithm, such as an iterative optimization or a machine-learning algorithm. For example, the feedback mechanism or circuitry may include an iterative optimization or machine-learning algorithm comprising a deep learning algorithm, a decision tree learning algorithm, a Bayesian network, or a genetic/evolutionary algorithm, among other suitable examples. The feedback mechanism or circuitry may generally be implemented either in hardware or software. Thus, the feedback mechanism or circuitry may comprise a suitable processor or processors, controller or controllers, functional units, circuitry, processing logic, microprocessor arrangements, etc., that are operable to perform the various steps or functions, etc., such as appropriately dedicated hardware elements or processing circuitry and/or programmable hardware elements or processing circuitry that can be programmed to operate in the desired manner. That is, the feedback mechanism or circuitry may comprise a computer-controlled algorithm and/or optimization procedure. The controller may thus comprise a computer, or one or more processors, running software code that when executed on the computer or processor(s) controls the output of the optical system, or, specifically, controls the signal preparation device to control the output of the optical system, in the manner described herein.

Thus, an optimization of the optical system output may be obtained by monitoring the output of the optical system and automatically iteratively changing the system parameters, for example the relative proportions of the different optical signal components, to tune the output towards a target output. For instance, in embodiments, the present methods may comprise steps of characterizing an output of the optical system using one or more targeted criteria; and adjusting the relative proportions of the different optical signal components, and the individual properties thereof, for example by adjusting the signal preparation device, based on the characterized output. The method may further comprise iteratively adjusting the relative proportions of the different optical signal components to optimize or adjust the output of the optical system. These steps may be implemented in the optical apparatus by the controller.

The above-described method, utilizing a feedback mechanism, ultimately lets the system determine the optimal parameters for providing the desired output. Such automatic optimization processes may thus offer a significant improvement compared to extensive numerical studies or human trial-and-error methods, especially where the ideal system parameters or initial conditions for a specific application are unknown or otherwise difficult to determine. Thus, the methods presented herein when implemented in combination with such adaptive feedback control allow for an improved control of the system, by a process of self-adjustment, without the end user requiring prior knowledge of the underlying system dynamics. It may be appreciated that this flexible and automatic adjustment of the pulse component parameters may therefore be of particular advantage when the signal preparation device is used as part of, or with, a complex optical system, for example a nonlinear optical system, of the type described above for which the optimal configuration could not otherwise easily be determined.

Thus, it may be appreciated that the methods presented herein, at least in embodiments, may help to overcome some of the drawbacks of the previous methods for attempting to optimize or control the output of complex optical systems. For example, the present methods are capable of providing a highly adjustable output of signal components or pulses that enable the customization of nonlinear interactions within the system, thus mediating the evolution of the optical signal components towards desired and useful output light characteristics for the system.

The optical signal components that are generated are provided as input to an optical system comprising an optical device and/or medium. It is the interactions of the optical signal components within the optical system that determines the output of the optical system. As mentioned above, the optical system is generally complex, for example nonlinear. The interactions of the signal components within the optical system are therefore based on intrinsically complex, for example chaotic or nonlinear, processes that are difficult to model analytically. The controllably generated optical signal components thus provide a means for optimizing the input to the optical system to achieve a target output characteristic.

Various potential applications of the methods described herein are contemplated. By way of example, some potential applications include, but are not limited to, providing advanced laser and tunable optical sources, advanced optical pulse metrology, optical imaging, pump-probe measurements, fluorescence spectroscopy, supercontinuum generation, etc.

For instance, in some cases, the optical signal components may be passed directly to an optical device that generates an output based on the received signal components. In other embodiments, the optical signal components that are generated may first be passed through a propagation medium before they are ultimately passed to an optical device, or otherwise used, to generate an output. For instance, in embodiments, the optical system comprises a nonlinear propagation medium. The optical signal components that are generated and passed to this medium may thus propagate and/or interact within the nonlinear medium in a complex nonlinear way that is difficult to describe analytically. The methods presented herein may generally allow for optimization of the optical system, independently of the medium and without requiring prior knowledge of these interactions. That is, by appropriately adjusting the properties of the signal components that are passed into the nonlinear medium, it is possible to control the interactions of the signal components within the nonlinear medium, therefore adjusting and/or optimizing the output of the optical system. It may be appreciated that the present method is therefore highly versatile whilst still being capable of finely tuning the output towards a specific desired or targeted parameter value.

For example, in embodiments, there is provided a method of generating a broadband spectrum or supercontinuum using a method and/or optical apparatus substantially as described herein. In other words, the methods and apparatuses described herein may be used to provide a supercontinuum source. In general, the methods and apparatuses described herein may be used to generate essentially arbitrary optical outputs. For instance, in other embodiments, the methods and apparatuses described herein may be used to provide a frequency comb.

Thus, the methods and apparatuses described herein may be used to provide advanced optical sources or source assemblies for use in a range of applications. For instance, the methods and apparatuses described herein may be used to provide an optical source pulse for use in various metrology, imaging and spectroscopy applications. For example, in embodiments, the output of the optical system may be used to perform pump-probe measurements or fluorescence spectroscopy. As another example, in embodiments, there is provided an optical imaging method comprising a method as claimed in any preceding claim, wherein the optical system comprises an optical imaging system comprising an optical imaging device and a medium wherein either the medium is a nonlinear medium or wherein the medium is an element to be imaged. That is, the output of the optical system may be used for imaging purposes. It is also contemplated that the output that is optimized may include the element that is being imaged, so that element to be imaged is part of the optical system.

As another example, in other embodiments, the optical system may comprise a resonating optical feedback/cavity system comprising an optical source and an optical cavity including a signal preparation device that acts on an input optical signal provided by the optical source to generate as output a plurality of optical signal components having different properties. In this case, the optical signal components can, at least in part, be used to provide optical feedback to the system. As a further example, the optical cavity system may be provided within a laser cavity. In this case, the signal components that are generated may be passed into the laser gain medium, and the signal components controlled or selected in order to control the output of the laser. In general, the optical system may comprise any optical device. The optical device generally acts to generate an output based on the received optical input signal components. The output of the optical device may be an optical output, but need not be. For example, the optical signal components may be provided directly to an optical device such as a microscope, or imaging device, and used to control or optimize the output of that optical device, for example the contrast of an element that is being imaged. For instance, where the optical response of the optical system including the element that is being imaged is non-trivial, as typically not known nor easy to model, the present methods may then be used to optimize the light input to the optical system depending on the user's requirements.

The signal preparation device that may be used to generate the optical signal components may take various suitable forms, as desired. For instance, the signal preparation device may in some examples be implemented using suitable combinations of pulse or wave shaper devices and/or optical modulator devices, which may, for example, be cascaded, arranged in series for example, to allow for an individual control over multiple properties of the signal components. However, such devices are often expensive and limited in terms of speed, complexity, compactness, stability, losses, and tunability, ultimately constraining the possibilities for optimal nonlinear process control. For instance, optical modulators, for example for active phase/amplitude modulation, are typically driven by external electronic signal generators and are limited in terms of speed and bandwidth, typically outputting sinusoidal optical waveforms at a few tens of GHz at best. Furthermore, typical devices for adjusting polarization, power, wavelength, or phase properties, such as tunable lasers, for controlling pulse durations or wavelengths, as well as other bulk/fiber-based systems, are generally limited to the tunability of only one pulse or pulse property, so that complexity and costs of the system scale linearly with the number of signal components or parameters required. Pulse shapers, including for example spectral tailoring wave shaper devices, offer an alternative for controlling the pulse shape and spectral chirp via arbitrary spectral amplitude and phase modification. Nevertheless, such devices are costly, up to several tens of thousands of dollars for instance, and suffer from limited power handling, relatively slow update rates, typically few tens of Hz, as well as limited bandwidth and spectral resolution. In addition, these pulse shaper devices are typically relatively large, limiting their potential integration within compact optical systems.

Thus, such wave shaping or modulating methods generally allow control of only one parameter, for example power, polarization, pulse shape, and/or are intrinsically limited to the optimization of one criterion, for example the shape of the optical pulse may be optimized, but one would essentially need several different pulses for the optimization of multiple objectives. Indeed, in many such devices, the optimization of two distinct features, for example the spectral intensity at two different wavelengths during supercontinuum generation, cannot typically be independently controlled. In such cases, one would therefore require multiple devices in order to prepare multiple pulses, each independently tuned to comply with the optimization of one single criterion.

In embodiments therefore, there is provided a signal preparation device that acts to split an input optical signal into a plurality of optical signal components, in the way of an "optical signal splitting device". For example, in embodiments, the optical system includes a signal preparation device that comprises an optical signal splitting device comprising a plurality of signal modifying elements, each signal modifying element comprising a plurality, for example two or more of branches along which optical signal(s) arriving at the signal modifying element may travel, wherein at least some of the signal modifying elements are configured so that optical signals travelling along different branches thereof are modified in different ways, wherein the plurality of signal modifying elements are cascaded so that the respective branches thereof define multiple possible pathways for optical signals to travel through the signal preparation device, so that an optical signal input to the device can be split into a plurality of optical signal components that have travelled along different pathways through the device and therefore have different optical properties; and one or more switching elements for controlling the proportion of optical signals travelling along the different pathways through the signal preparation device and hence the relative proportions and individual optical properties of the optical signal components.

There is provided an optical signal splitting device as described above which may be used as a sub-system within any desired, complex, optical system in order to help control the output thereof in the manner described herein.

It may be appreciated that such a device allows generating multiple optical signal components and for adjusting the properties thereof. For example, by controlling the proportion of optical signals that travel along the different pathways through the device it is possible to directly control the relative proportions of the different optical signal components. Furthermore, by configuring the device so that the different pathways are each associated with different propagation dynamics, it is also possible to directly control or adjust the optical properties of each of the individual signal components by controlling the splitting or routing of the different signal components between the different pathways of the device.

For instance, at least some of the signal modifying elements may be configured so that the different branches thereof have different optical or physical path lengths, or are otherwise configured, for example so that optical signals travel at different speeds along the different branches, so as to introduce relative time delays between optical signals travelling along the different branches, the signal preparation device comprising a "temporal optical signal splitting device. Thus, optical signals travelling along a first of the branches of a beam splitting element may be delayed in time relative to optical pulses travelling along another (second) branch thereof. In this way, an optical pulse arriving at the beam splitting element may be temporally split into two or more signal components with the relative intensity of the signal components determined by the proportions of the optical signal travelling along the respective branches. It may be appreciated that the signal components need not be completely temporally separated, and may still partially overlap for example where the length of the signal component is larger than the relative delay that is introduced.

Accordingly, in this case, by controlling the splitting ratio between the branches of the (or each) signal modifying element, it is possible to directly control the relative intensities and delays of the generated signal components. In this case, the signal modifying elements essentially act as "delay lines" or "unbalanced interferometers" within the optical signal splitting device.

It may be appreciated that this method may also allow for the adjustment of other correlated properties. For instance, the temporal spreading of the signal components is determined, at least in part, by dispersion effects, and may thus also be modified by controlling the effective propagation lengths travelled by the different signal components within the signal preparation device. Similarly, the pulse phase or spectral shape, for example chirp, may be modified by controlling the effective nonlinear path lengths travelled by the different signal components. For instance, the nonlinear regime may be explored by providing relatively high power and short duration input signals or pulses to the signal preparation device. That is, some of the optical properties of the signal components can be correlated so that adjustment of a single splitting ratio of the signal preparation device, or of a single parameter of the input optical signal, can lead to multiple properties of the signal components changing.

The signal modifying elements need not be configured (only) to introduce relative delays, and in general may be configured to modify the signal components in any suitable and desired ways. For example, it may be appreciated that additional elements, or "hybrid" pathways (for example using different materials, spatial/polarization modes or wave guiding effects such as nonlinear/dispersion coefficients, losses, spectral filtering, etc.) may be incorporated into the optical signal splitting device to allow for direct control of pulse properties such as pulse width; spectral shape, for example chirp; phase profile, linear or nonlinear; and relative phase/delays. That is, at least some of the signal modifying elements may also, or alternatively, be configured so as to introduce a differential polarization, or phase change, etc., among signal components travelling along the different branches thereof.

The geometries of the signal modifying elements are typically fixed, such as so that the form and composition of the branches thereof are fixed. The physical lengths and/or form of the branches could also be varied, or variable, for example by incorporating a thermally tuneable or piezoelectric material, or similar.

The signal modifying elements are typically arranged in a cascaded manner so that the respective branches thereof define a plurality of unique pathways for optical signals to travel through the device, with each pathway comprising one of the branches for each of the signal modifying elements along the pathway. The pathways are thus generally each associated with different propagation dynamics relative to one another, or for example to a designated reference pathway. The optical signal components that are produced, as well as the individual optical properties of the signal components, may thus be readily adjusted by controlling the proportions of optical signals that pass along the different pathways. In general, an optical signal input to the device can be split into as many signal components as there are unique pathways through the device.

The generated signal components may thus be considered as being "replicas" of an original input signal provided to the optical signal splitting device, but modified according to the pathway along which they have travelled, for example delayed in time and/or with other variations in optical properties that may be introduced by the propagation of the optical signals along the different pathways, for example with variations in phase, chirp, intensity profile, spectral properties, power, polarization, etc. Thus, it may be appreciated that by controlling the splitting ratios, and subsequent routing, between the different branches of the optical signal splitting device, the device is capable of providing a highly adjustable output of signal components that may be particularly suitable for optimizing the control of complex optical systems according to the methods presented herein.

In general, where such an optical signal splitting device is provided, each of the signal modifying elements may have any number of branches, as desired, and naturally increasing the number of branches increases the number of pathways through the device, and hence offers additional configurability. The branches are generally re-combined at the output of the signal modifying element, so that optical signal components that have travelled along the different branches may be re-combined at a single output of the signal modifying element, but delayed and/or with modified properties depending on the branch they have travelled along. That is, the plurality of signal modifying element is generally arranged in series, such as so that the optical pulses travel sequentially through each of the beam splitting elements, such as so that the output of each beam splitting element is provided, optionally via the switching elements, as explained hereinabove, to an input of the next beam splitting element in the series, and so on.

It may be appreciated that at least some of the signal modifying elements may also be used to split the optical signal components spatially. For instance, the optical signal splitting device may comprise two outputs, and one of the signal modifying elements, for example the last one in the cascade, can be used to switch between the outputs of the optical signal splitting device. The device may also comprise multiple inputs, which may provide further means for adjusting the optical output. In that case, the signal modifying elements may act in part to merge the optical pulses from the multiple inputs, using for example multiple optical sources, into a single combined output.

In general, the splitting ratios between the different branches of each of the signal modifying elements may be configured or selected as desired. For instance, where the signal modifying element(s) comprise two different branches, the optical signal(s) may be split equally, in terms of intensity or amplitude, between the two branches, such as a splitting ratio of 50:50, such as 50%, so that signal components travel simultaneously along the different branches. Alternatively, all of the optical signal (s) may be sent along one or the other branch, such as a splitting ratio of 0:100 or 100:0, for example 0 or 100%. In embodiments, the splitting ratio for each signal modifying element may be adjusted substantially continuously between 0 and 100%. It is also contemplated that the splitting ratio may be adjustable only between a number of discrete splitting ratios, for example 0%, 50% and 100%. It may be appreciated that this may simplify the control arrangements whilst still allowing for a relatively large amount of adjustability.

The splitting ratios for the plurality of signal modifying elements in turn determine the proportion of optical signal components that travel along the different respective pathways through the device. Furthermore, it may be appreciated that the output of the optical signal splitting device, such as the signal components, and the properties thereof, may be adjusted by controlling the proportion of optical signal(s) that travel along the different respective pathways through the device. Thus, by adjusting the proportion of optical signal(s) travelling along the different respective pathways of the device, specifically by controlling the proportion of optical signal(s) travelling along each of the respective branches of the signal modifying elements in the cascade, the output of the device may be adjusted accordingly.

One or more switching elements are thus provided for controlling the proportion of optical signal components that travel along the different respective pathways through the device. Suitably, each of the signal modifying elements has an associated switching element in order to control the individual splitting ratios of the signal modifying elements. For example, a switching element may be disposed upstream of, or at the input to, each signal modifying element wherein the switching element is operable to determine or control the proportion of optical signal(s) travelling along the different branches of the respective signal modifying element. Thus, in embodiments, a corresponding plurality of switching elements for each of the plurality of signal modifying elements is provided. The switching elements may generally comprise any suitable beam/pulse directing means. In embodiments, the switching elements comprise "interferometers", such as Mach-Zehnder interferometers. The switching elements may thus also comprise two or more optical branches. In this case, by introducing a relative phase difference between the different branches of the switching elements, it is possible to alternately direct or split optical pulses along the different pathways through the device.

The switching elements may be used to control the splitting ratios so that optical signals are directed along the different pathways according to their intensity or amplitude. It is also contemplated that the switching elements may be configured to alternately direct optical signals along the different branches based on their wavelength, polarization, or spatial modes, thus providing further ways of controlling the different properties of the different signal components.

As mentioned above, it is contemplated that the optical signal splitting device may be pre-configured, such as so that the splitting ratios, associated with each of the signal modifying elements, and hence pathways, are pre-adjusted and fixed for a particular application or optical source, for example following a pre-optimization or calibration procedure. In embodiments, the optical signal splitting device is tuneable, or controllable, to adjust or control the number and/or properties of the signal components generated by the device. For example, in embodiments, where the switching elements comprise interferometers, the switching elements may each be associated with one or more electrodes to which a voltage may be applied to introduce a variable thermal modification to one or more of the branches of the switching element in order to introduce a relative phase difference therebetween to control the proportion of optical signals travelling along the different pathways. Thus, the switching elements may be tuned thermally. It may be contemplated that the switching elements may suitably be tuned in various other ways, for example using electro-optic, such as the Pockels effect, or plasmonic effects), acousto-optic, or electro-absorption mechanisms among others.

In particular, the optical signal splitting device may be tuned or controlled using a feedback mechanism, as discussed above. That is, a feedback mechanism may be used to automatically adjust the splitting ratios between the different pathways of the optical signal splitting device, for example by appropriately controlling the switching elements, and thus to optimize the generated signal components based on a target output.

The optical signal splitting device may suitably be implemented in various different ways. For instance, the optical signal splitting device may be implemented using optical fibers, or optical elements arranged in free space. The optical signal splitting device may be integrated onto a photonic chip. That is, the signal modifying elements and pathways may comprise continuous waveguide structures integrated onto a photonic chip. In other words, the optical signal splitting device may be an "integrated" device. The integrated optical signal splitting device may generally comprise a sub-component of the optical system. In embodiments, the optical system, or at least part of the optical system, can also be integrated onto the same photonic chip as the optical signal splitting device. For example, the optical signal splitting device and a propagating medium may both be integrated onto a single photonic chip.

The scope of the claims should not be limited by the embodiments set forth in the examples, but should be given the broadest interpretation consistent with the description as a whole.

The invention claimed is:

1. A method for controlling an optical system to a target output, the method comprising:
   i) generating at least two optical signal components, by splitting an input optical signal provided by an optical source, using a plurality of signal modifying elements, each signal modifying element comprising a plurality of branches along which at least one optical signal arriving at the signal modifying element travels, wherein at least one of the signal modifying elements is configured so that optical signals travelling along different branches are modified in different ways, the signal modifying elements being cascaded so that respective branches thereof define multiple pathways for optical signals to travel, so that the input optical signal is split into a plurality of optical signal components that have travelled along different pathways and result with different optical properties and a controlled phase relation; and at least one switching element controlling the proportion of optical signals travelling along the different pathways and hence relative proportions and individual optical properties of the optical signal components;
   ii) interacting the optical signal components generated in step i) within the optical system;
   iii) characterizing a resulting output of the optical system with respect to the target output;
   iv) adjusting parameters of said generating the optical signal components in step i) with results of said characterizing; and
   v) repeating steps i) to iv) until the target output.

2. The method of claim 1, wherein said step iv) comprises adjusting the relative proportions of the optical signal components that are generated and the individual optical properties thereof.

3. The method of claim 1, comprising automatically adjusting the relative proportions of the optical signal components that are generated and the individual optical properties thereof in order to adjust the output of the optical system to the target output using a feedback mechanism through step v).

4. The method of claim 1, wherein said generating at least two optical signal components in step i) comprises generating the input optical signal and passing the input optical signal to a signal preparation device.

5. The method of claim 1, wherein the optical system is a nonlinear system.

6. The method of claim 1, wherein the optical system comprises at least one of: a resonating system and an optical feedback system.

7. The method of claim 1, wherein the optical system comprises a laser cavity.

8. An optical imaging method comprising a method as claimed in claim 1, wherein the optical system comprises an optical imaging system comprising an optical imaging device and a medium, the medium being one of: i) a nonlinear medium and ii) an element to be imaged.

9. A signal preparation device, for use in the method as claimed in claim 1, comprising the plurality of signal modifying elements and the at least one switching element.

10. An optical apparatus, comprising:
   a signal preparation device comprising a plurality of signal modifying elements, each signal modifying element comprising a plurality of branches along which at least one optical signal arriving at the signal modifying element travels, wherein at least one of the signal modifying elements is configured so that optical signals travelling along different branches are modified in different ways, the signal modifying elements being cascaded so that respective branches thereof define multiple pathways for optical signals to travel, so that an input optical signal is split into a plurality of optical signal components that have travelled along different pathways and result with different optical properties and a controlled phase relation; and at least one switching element controlling relative proportions of the optical signals travelling along the different pathways and hence relative proportions and individual optical properties of the plurality of optical signal components, the signal preparation device generating as output, from the input optical signal, at least two optical pulse trains having different optical properties; and
   an optical system, the at least two optical pulse trains generated by the signal preparation device being sent for interaction in said optical system in order to generate an output of the optical system;
   an ouput monitor characterizing the output of the optical system with respect to a target output; and
   a computer adjusting parameters of said signal preparation device with results from said output monitor;
   wherein said signal preparation device is fed with parameters adjusted by said computer until the target output of the optical system, in a feedback mechanism.

11. The apparatus of claim 10, wherein the optical system comprises a controller controlling the signal preparation device to adjust the relative proportions of the at least two optical pulse trains that are generated and the individual properties thereof with the parameters adjusted by said computer.

12. The apparatus of claim 10, comprising an optical source generating the input optical signal.

13. The apparatus of claim 10, wherein the optical system comprises a nonlinear medium.

14. A feedback system, comprising an optical source generating an input optical signal and an optical cavity including a signal preparation device, said signal preparation device acting on the input optical signal provided by said optical source to generate at least two optical pulse trains having different properties, wherein relative proportions of the at least two optical pulse trains that are generated and the individual optical properties thereof are used to provide feedback to the system, wherein the signal preparation device comprises multiple stages arranged in a cascade, wherein each stage is individually controlled to adjust at least one of: i) the relative proportions and ii) individual optical properties of the at least two optical pulse trains generated by the signal preparation device.

15. The system of claim 14, wherein the signal preparation device is configured to introduce different relative delays to the generated at least two optical pulse trains so that at least some of the generated at least two optical pulse trains are at least partially temporally separated.

16. The system of claim 14, wherein the signal preparation device is configured to at least one of: i) select and ii)

control at least one of: i) relative delays between different at least two optical pulse trains; ii) relative phases between different at least two optical pulse trains; iii) signal component powers;(iv) signal component shape; v) nonlinear phase; vi) wavelength; vii) spectral phase; and viii) polarization.

17. The system of claim 14, wherein the signal preparation device comprises an optical signal splitting device, said optical signal splitting device splitting an input optical signal into at least two optical pulse trains having different optical properties.

18. The system of claim 14, wherein the signal preparation device comprises an optical signal splitting device comprising a plurality of signal modifying elements, each signal modifying element comprising a plurality of branches along which at least one optical signal arriving at the signal modifying element travels, wherein at least one of the signal modifying elements is configured so that optical signals travelling along different branches are modified in different ways, wherein the signal modifying elements are cascaded so that the respective branches thereof define multiple pathways for optical signals to travel through the signal preparation device, so that an optical signal input to the device is split into a plurality of optical signal components that have travelled along different pathways through the device and result with different optical properties; and at least one switching element controlling the proportion of optical signals travelling along the different pathways through the signal preparation device and hence the relative proportions and individual optical properties of the optical signal components.

19. A laser system, comprising a laser cavity including a gain medium and a signal preparation device, said signal preparation device generating at least two optical pulse trains having different properties, wherein relative proportions of the at least two optical pulse trains that are generated and the individual optical properties thereof are at least one of: i) selected and ii) controlled to control the output of the laser system, wherein the signal preparation device comprises multiple stages arranged in a cascade, wherein each stage is individually controlled to adjust at least one of: i) the relative proportions and ii) individual optical properties of the least two optical pulse trains generated by the signal preparation device.

\* \* \* \* \*